(12) United States Patent
Amin et al.

(10) Patent No.: US 11,062,227 B2
(45) Date of Patent: Jul. 13, 2021

(54) SYSTEMS AND METHODS FOR CREATING AND USING QUANTUM BOLTZMANN MACHINES

(71) Applicant: D-WAVE SYSTEMS INC., Burnaby (CA)

(72) Inventors: Mohammad H. S. Amin, Coquitlam (CA); Evgeny Andriyash, Vancouver (CA); Jason Rolfe, Vancouver (CA)

(73) Assignee: D-WAVE SYSTEMS INC., Burnaby (CA)

( * ) Notice: Subject to any disclaimer, the term of this patent is extended or adjusted under 35 U.S.C. 154(b) by 556 days.

(21) Appl. No.: 15/766,755

(22) PCT Filed: Oct. 14, 2016

(86) PCT No.: PCT/US2016/057208
§ 371 (c)(1),
(2) Date: Apr. 6, 2018

(87) PCT Pub. No.: WO2017/066695
PCT Pub. Date: Apr. 20, 2017

(65) Prior Publication Data
US 2018/0308007 A1    Oct. 25, 2018

Related U.S. Application Data

(60) Provisional application No. 62/242,626, filed on Oct. 16, 2015.

(51) Int. Cl.
*G06N 10/00* (2019.01)
*G06N 20/00* (2019.01)
(Continued)

(52) U.S. Cl.
CPC .............. *G06N 10/00* (2019.01); *B82Y 10/00* (2013.01); *G06N 3/0445* (2013.01); *G06N 20/00* (2019.01)

(58) Field of Classification Search
CPC ...... G06N 10/00; G06N 20/00; G06N 3/0445; B82Y 10/00
(Continued)

(56) References Cited

U.S. PATENT DOCUMENTS

2008/0176750 A1   7/2008  Rose et al.
2012/0124432 A1   5/2012  Pesetski et al.
(Continued)

OTHER PUBLICATIONS

International Search Report, dated Jan. 25, 2017, for PCT/US2016/057208, 4 pages.
(Continued)

*Primary Examiner* — Harry W Byrne
(74) *Attorney, Agent, or Firm* — Cozen O'Connor

(57) ABSTRACT

A hybrid computer generates samples for machine learning. The hybrid computer includes a processor that implements a Boltzmann machine, e.g., a quantum Boltzmann machine, which returns equilibrium samples from eigenstates of a quantum Hamiltonian. Subsets of samples are provided to training and validations modules. Operation can include: receiving a training set; preparing a model described by an Ising Hamiltonian; initializing model parameters; segmenting the training set into subsets; creating a sample set by repeatedly drawing samples until the determined number of samples has been drawn; and updating the model. Operation can include partitioning the training set into input and output data sets, and determining a conditional probability distribution that describes a probability of observing an output vector given a selected input vector, e.g., determining a conditional probability by performing a number of operations to minimize an upper bound for a log-likelihood of the conditional probability distribution.

24 Claims, 12 Drawing Sheets

(51) Int. Cl.
*B82Y 10/00* (2011.01)
*G06N 3/04* (2006.01)

(58) Field of Classification Search
USPC .......................................................... 706/12
See application file for complete search history.

(56) References Cited

U.S. PATENT DOCUMENTS

2015/0269124 A1 9/2015 Hamze et al.
2015/0363708 A1* 12/2015 Amin .................... G06N 10/00
712/42

OTHER PUBLICATIONS

Geordie, "Training DBMs with physical neural nets" In: Hack the Multiverse, Jan. 24, 2014, pp. 2-5. Retrieved from the Internet: URL: https://dwave.wordpress.com/2014/01/24/training-dbms-with-physical-neural-nets, see pp. 2-5.

Wittek, Peter, "What Can We Expect from Quantum Machine Learning?", Yandex 1-32 School of Data Analysis Conference Machine Learning: Prospects and Applications, Oct. 5, 2015. pp. 1-16. Retrieved from the Internet: URL: http://www.slideshare.net/peter_wittek/what-can-we-expect-from-quantum-machine-learning, see p. 11.

Written Opinion, dated Jan. 25, 2017, for PCT/US2016/057208, 8 pages.

"On the Challenges of Physical Implementations of RBMs", arXiv:1312.5258V1 [stat.ML] Dec. 18, 2013, XP-002743443, 9 pages.

Geordie, Rose, "First ever DBM trained using a quantum computer", Hack the Multiverse, Programming quantum ,computers for fun and profit, XP-002743440, Jan. 6, 2014, 8 pages.

Hinton, Geoffrey, "A Practical Guide to Training Restricted Boltzmann Machines", Version 1, Department of Computer Science University of Toronto, Aug. 2, 2010, 21 pages.

* cited by examiner

SYSTEMS AND METHODS FOR CREATING AND USING QUANTUM BOLTZMANN MACHINES

BACKGROUND

Field

This disclosure generally relates to systems, devices, methods, and articles that obtain equilibrium samples from eigenstates of quantum Ham iltonians, and application of these samples, for example, in machine learning.

Boltzmann Machines

A Boltzmann machine is an implementation of a probabilistic graphical model that includes a graph with undirected weighted edges between vertices. The vertices (also called units) follow stochastic decisions about whether to be in an "on" state or an "off" state. The stochastic decisions are based on the Boltzmann distribution. Each vertex has a bias associated with the vertex. Training a Boltzmann machine includes determining the weights and the biases.

Boltzmann machines can be used in machine learning because they can follow simple learning procedures. For example, the units in a Boltzmann machine can be divided into visible units and hidden units. The visible units are visible to the outside world, can be divided into input units and output units. The hidden units are hidden from the outside world. There can be more than one layer of hidden units.

If a user provides a Boltzmann machine with a plurality of vectors as input, the Boltzmann machine can determine the weights for the edges, and the biases for the vertices, by incrementally adjusting the weights and the biases until the machine is able to generate the plurality of input vectors with high probability. In other words, the machine can incrementally adjust the weights and the biases until the marginal distribution over the variables associated with the visible units of the machine matches an empirical distribution observed in the outside world, or at least, in the plurality of input vectors.

In a Restricted Boltzmann Machine, there are no intralayer edges (or connections) between units. In the case of a RBM comprising a layer of visible units and a layer of hidden units, there are no edges between the visible units and no edges between the hidden units.

The edges between the visible units and the hidden units can be complete (i.e., fully bipartite) or less dense.

Quantum Devices

Quantum devices are structures in which quantum mechanical effects are observable. Quantum devices include circuits in which current transport is dominated by quantum mechanical effects. Such devices include spintronics, where electronic spin is used as a resource, and superconducting circuits. Both spin and superconductivity are quantum mechanical phenomena. Quantum devices can be used for measurement instruments, in computing machinery, and the like.

Quantum Computation

Quantum computation and quantum information processing are active areas of research and define classes of vendible products. A quantum computer is a system that makes direct use of at least one quantum-mechanical phenomenon, such as, superposition, tunneling, and entanglement, to perform operations on data. The elements of a quantum computer are quantum binary digits, known as qubits. Quantum computers hold the promise of providing exponential speedup for certain classes of computational problems such as computational problems simulating quantum physics. Useful speedup may exist for other classes of problems.

One model of quantum computing is adiabatic quantum computing. Adiabatic quantum computing can be suitable for solving hard optimization problems, for example. Further details on adiabatic quantum computing systems, methods, and apparatus are described, for example, in U.S. Pat. Nos. 7,135,701; and 7,418,283.

Quantum Annealing

Quantum annealing is a computational method that may be used to find a low-energy state of a system, typically preferably the ground state of the system. Similar in concept to classical simulated annealing, the method relies on the underlying principle that natural systems tend towards lower energy states because lower energy states are more stable. While classical annealing uses classical thermal fluctuations to guide a system to a low-energy state, quantum annealing may use quantum effects, such as quantum tunneling, as a source of delocalization to reach an energy minimum more accurately and/or more quickly than classical annealing.

Adiabatic quantum computation may be considered a special case of quantum annealing. In adiabatic quantum computation, ideally, the system begins and remains in its ground state throughout an adiabatic evolution. Thus, those of skill in the art will appreciate that quantum annealing systems and methods may generally be implemented on an adiabatic quantum computer. Throughout this specification and the appended claims, any reference to quantum annealing is intended to encompass adiabatic quantum computation unless the context requires otherwise.

BRIEF SUMMARY

Quantum Boltzmann Machine

The present disclosure describes a quantum Boltzmann machine implemented using a quantum computer in which units in the quantum Boltzmann machine are composed of quantum devices, or qubits. The present disclosure describes systems and methods for training a quantum Boltzmann machine in the presence of quantum fluctuations. The quantum Boltzmann machine described in the present disclosure can return equilibrium samples from eigenstates of a quantum Hamiltonian. The Hamiltonian can be a non-stoquastic, or a stoquastic Hamiltonian such as a transverse Ising Hamiltonian. These samples can be used for machine learning. Furthermore, the present systems and methods can simplify the task of quantum machine learning, and eliminate, or at least reduce, the need for post-processing. In some embodiments, samples can be generated by a digital computer via a classical heuristic method such as quantum Monte Carlo.

A hybrid computer may be summarized as including: a digital computer comprising a training and validations instructions module operable to execute machine learning; and a quantum computer comprising a plurality of qubits and one or more couplers that selectively provide communicative coupling between pairs of the qubits, the quantum computer which implements a quantum Boltzmann machine, the quantum Boltzmann machine operable to return one or more equilibrium samples from eigenstates of a quantum Hamiltonian, the quantum computer communicatively coupled to the digital computer to provide at least a subset of the one or more samples to the training and validations instructions module of the digital computer.

The quantum computer may be a quantum annealer. The quantum annealer may be operable to follow a piecewise annealing schedule, the piecewise annealing schedule comprising projective measurement at a determined time during the piecewise annealing schedule.

In any of the above described embodiments or implementations, the quantum Hamiltonian may be a stoquastic Hamiltonian. The stoquastic Hamiltonian may be a transverse Ising Hamiltonian. In any of the above described embodiments or implementations, the quantum Hamiltonian may be a non-stoquastic Hamiltonian.

A method of training a quantum Boltzmann machine using a hybrid computer comprising a quantum computer may be summarized as including: receiving a training set by the hybrid computer; preparing a model described by a quantum Hamiltonian; initializing one or more parameters of the model; segmenting the training set into one or more subsets of the training set; for each of the one or more subsets of the training set, creating a sample set comprising a predetermined number of samples by repeatedly drawing a sample from the quantum computer and storing the sample in the sample set until the predetermined number of samples has been drawn; and updating the model using the sample set; returning the model by the hybrid computer.

Preparing a model described by a quantum Hamiltonian may include preparing a model comprising a plurality of visible variables and a plurality of hidden variables. Preparing a model described by a quantum Hamiltonian may include preparing a graphical model comprising a plurality of vertices and one or more edges. Initializing one or more parameters of the model may include initializing a plurality of local biases and one or more weights. Preparing a model described by a quantum Hamiltonian may include preparing a model described by a transverse Ising Hamiltonian. Initializing one or more parameters of the model may include initializing a ratio of a qubit tunneling amplitude to a temperature. In any of the above described embodiments, creating a sample set comprising a predetermined number of samples by repeatedly drawing a sample from the quantum computer may include creating a sample set comprising a predetermined number of samples by repeatedly drawing a sample from a quantum processor. Creating a sample set comprising a predetermined number of samples by repeatedly drawing a sample from a quantum processor may include creating a sample set that comprises a predetermined number of samples by repeatedly drawing a sample from a superconducting quantum processor comprising a plurality of superconducting qubits and one or more superconducting coupling devices.

A method for discriminative learning may be summarized as including: receiving a training set; partitioning the training set into input data and output data; and determining a conditional probability distribution that describes a probability of observing an output vector given a selected input vector; wherein determining a conditional probability distribution that describes a probability of observing an output vector given a selected input vector includes determining a conditional probability by performing a number of operations to minimize (e.g., seeking to minimize, minimizing) an upper bound for the log-likelihood of the conditional probability.

Performing a number of operations to minimize an upper bound for the log-likelihood of the conditional probability may include performing a gradient descent technique to minimize an upper bound for the log-likelihood of the conditional probability by a gradient descent technique. Performing a gradient descent technique to minimize an upper bound of the log-likelihood using a gradient descent technique may include sampling from a quantum Boltzmann distribution. Sampling from a quantum Boltzmann distribution may include following a quantum annealing schedule by a quantum processor comprising a quantum annealer.

A computer system that implements a Boltzmann machine may be summarized as including: at least one quantum processor, the at least one quantum processor including: a first set of the qubits that operate as a first number of visible units of the Boltzmann machine; a second set of the qubits that operate as a first number of hidden units of the Boltzmann machine; and a set of the interlayer couplers which provide a communicative coupling between the qubits of the first set of qubits and the qubits of the second set of qubits.

In some embodiments, the Boltzmann machine is a restricted Boltzmann machine.

In some embodiments, the computer system further includes a first plurality of the interlayer couplers which provide a communicative coupling between the qubits of the first set of qubits, and a second plurality of the interlayer couplers which provide a communicative coupling between the qubits of the second set of qubits.

In some implementations, the first set of qubits operate as an input visible layer, and the computer system further includes a third set of the qubits that operate as a visible output layer, the second set of qubits that operate as the hidden units of the Boltzmann machine logically coupled between first and the third set of qubits.

In some implementations, the computer system further includes a third plurality of the interlayer couplers which provide a communicative coupling between the qubits of the third set of qubits.

In some of the above described implementations, the second set of qubits that operate as the hidden units of the Boltzmann machine may operate as a first hidden layer of the Boltzmann machine, and the computer system further includes a fourth set of the qubits that operate as a second number of hidden units of the Boltzmann machine that form a second hidden layer of the Boltzmann machine, and a set of interlayer couplers which provide a communicative coupling between the qubits of the second set of qubits and the qubits of the fourth set of qubits.

In any of the above described implementations, the Boltzmann machine may return one or more equilibrium samples from eigenstates of a transverse Ising Hamiltonian.

In some implementations, the quantum processor is a quantum annealer.

In some implementations, the quantum annealer is operable to follow a piecewise annealing schedule, the piecewise annealing schedule including projective measurement at a determined time during the piecewise annealing schedule.

In some of the above described implementations, the computer system may further include at least one digital processor, and at least one nontransitory processor-readable media that stores at least one of digital processor executable instructions or data which, when executed by the at least one digital processor, cause the at least one digital processor to: receive a training set; prepare a model described by an Ising Hamiltonian; initialize one or more parameters of the model; segment the training set into one or more subsets of the training set; for each of the one or more subsets of the training set, create a sample set comprising a predetermined number of samples by repeatedly drawing a sample from the Boltzmann machine implemented by the at least one quantum processor and store the sample in the sample set until the predetermined number of samples has been drawn; and update the model using the sample set.

A computational system may be summarized as including: a digital computer that includes a training and validations instructions module operable to execute machine learning, and a quantum Boltzmann machine module, the quantum Boltzmann machine module operable to return one or more equilibrium samples from eigenstates of a quantum Hamiltonian, the digital computer operable to provide at least a subset of the one or more equilibrium samples of the quantum Boltzmann machine module to the training and validations instructions module to train a machine learning model.

In some implementations, the processor may be a digital processor, and the one or more samples may be generated via a classical heuristic method. In some implementations, the classical heuristic method may be a quantum Monte Carlo method.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been selected for ease of recognition in the drawings.

DETAILED DESCRIPTION

In the following description, some specific details are included to provide a thorough understanding of various disclosed embodiments. One skilled in the relevant art, however, will recognize that embodiments may be practiced without one or more of these specific details, or with other methods, components, materials, etc. In other instances, well-known structures associated with quantum processors, such as quantum devices, couplers, and control systems including microprocessors and drive circuitry have not been shown or described in detail to avoid unnecessarily obscuring descriptions of the embodiments of the present methods. Throughout this specification and the appended claims, the words "element" and "elements" are used to encompass, but are not limited to, all such structures, systems, and devices associated with quantum processors, as well as their related programmable parameters.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" "an embodiment", "another embodiment", "one example", "an example", "another example", "one implementation", "another implementation", or the like means that a particular referent feature, structure, or characteristic described in connection with the embodiment, example, or implementation is included in at least one embodiment, example, or implementation. Thus, the appearances of the phrases "in one embodiment", "in an embodiment", "another embodiment" or the like in various places throughout this specification are not necessarily all referring to the same embodiment, example, or implementation. Furthermore, the particular features, structures, or characteristics may be combined in any suitable manner in one or more embodiments, examples, or implementations.

It should be noted that, as used in this specification and the appended claims, the singular forms "a," "an," and "the" include plural referents unless the content clearly dictates otherwise. Thus, for example, reference to a problem-solving system including "a quantum processor" includes a single quantum processor, or two or more quantum processors. It should also be noted that the term "or" is generally employed in its sense including "and/or" unless the content clearly dictates otherwise.

The headings provided herein are for convenience only and do not interpret the scope or meaning of the embodiments.

Hybrid Computing System Comprising a Quantum Processor

Figure 1:
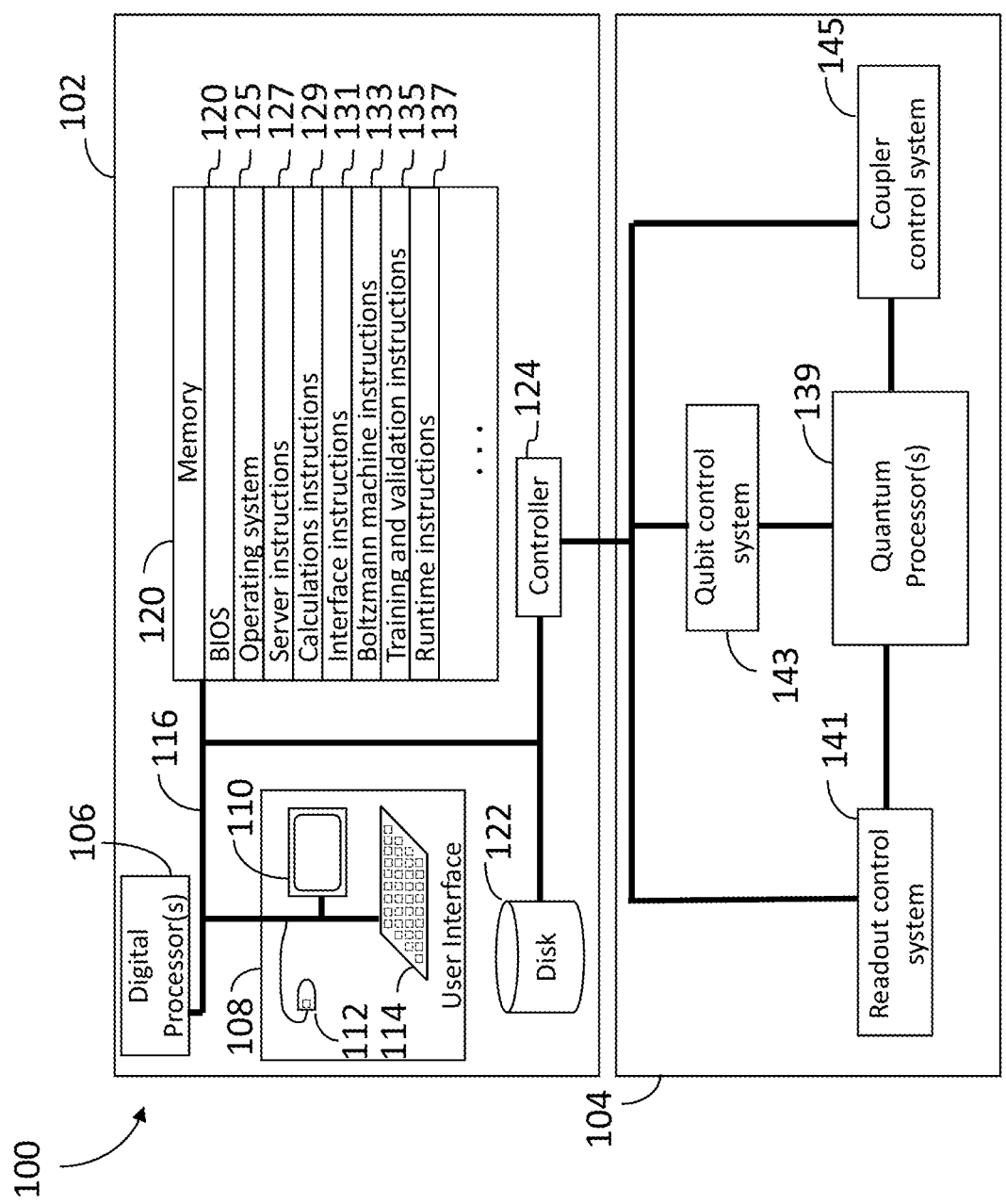
FIG. 1 is a schematic diagram that illustrates an exemplary hybrid computer in accordance with the present systems, devices, articles, and methods.

FIG. 1 illustrates a hybrid computing system 100 including a digital computer 102 coupled to a computing subsystem 104. Computing subsystem 104 can provide specialized functionality. In some implementations, computing subsystem 104 is an analog computer. In some implementations, computing subsystem 104 is a quantum computer, and the digital computer 102 is a classical computer. In some implementations, the quantum computer is a quantum annealer and/or an adiabatic quantum computer. In some implementations, the quantum computer is a gate-model quantum computer, or another suitable type of quantum computer. For example, a quantum computer can be used to return samples from a probability distribution efficiently.

The exemplary digital computer 102 includes a digital processor that may be used to perform classical digital processing tasks described in the present systems and methods. Those skilled in the relevant art will appreciate that the present systems and methods can be practiced with other digital computer configurations, including hand-held devices, multiprocessor systems, microprocessor-based or programmable consumer electronics, personal computers ("PCs"), network PCs, mini-computers, mainframe computers, and the like, when properly configured or programmed to form special purpose machines, and/or when communicatively coupled to control an analog computer or a quantum computer.

Digital computer 102 will at times be referred to in the singular herein, but this is not intended to limit the application to a single digital computer. The present systems and methods can also be practiced in distributed computing environments, where tasks or sets of instructions are performed or executed by remote processing devices, which are linked through a communications network. In a distributed computing environment computer- or processor-readable instructions (sometimes known as program modules), application programs and/or data, may be located in both local and remote memory storage devices (e.g., nontransitory computer- or processor-readable media).

Digital computer 102 may include at least one digital processor 106, at least one system memory 120, and at least one system bus 117 that couples various system components, including system memory 120 to digital processor 106.

The digital processor 106 may be any logic processing unit, such as one or more single core or multi-core microprocessors, central processing units ("CPUs"), graphics processing units ("GPUs"), digital signal processors ("DSPs"), application-specific integrated circuits ("ASICs"), field-programmable gate arrays ("FPGAs"), etc. Unless described otherwise, the construction and operation of the various blocks shown in FIG. 1 are of conventional design. As a result, such blocks need not be described in further detail herein, as they will be understood by those skilled in the relevant art.

Digital computer 102 may include a user input/output subsystem 108. In some implementations, the user input/output subsystem includes one or more user input/output components such as a display 110, mouse 112, and/or keyboard 114. System bus 116 can employ any known bus structures or architectures, including a memory bus with a memory controller, a peripheral bus, and a local bus. System memory 118 may include non-volatile memory, such as read-only memory ("ROM"), static random access memory ("SRAM"), Flash NAND; and volatile memory such as random access memory ("RAM") (not shown), all of which are examples of nontransitory computer- or processor-readable media. An basic input/output system ("BIOS") 120, which can form part of the ROM, contains basic routines that help transfer information between elements within digital computer 102, such as during startup.

Digital computer 102 may also include other non-volatile memory 122. Non-volatile memory 122 may take a variety of forms, including: a hard disk drive for reading from and writing to a hard disk, an optical disk drive for reading from and writing to removable optical disks, and/or a magnetic disk drive for reading from and writing to magnetic disks, all of which are examples of nontransitory computer- or processor-readable media. The optical disk can be a CD-ROM or DVD, while the magnetic disk can be a magnetic floppy disk or diskette. Non-volatile memory 122 may communicate with digital processor via system bus 116 and may include appropriate interfaces or controllers 124 coupled to system bus 116. Non-volatile memory 122 may serve as long-term storage for computer- or processor-readable instructions, data structures, or other data (also called program modules) for digital computer 102.

Although digital computer 102 has been described as employing hard disks, optical disks and/or magnetic disks, those skilled in the relevant art will appreciate that other types of non-volatile computer-readable media may be employed, such as magnetic cassettes, flash memory cards, Flash, ROMs, smart cards, etc., all of which are further examples of nontransitory computer- or processor-readable media. Those skilled in the relevant art will appreciate that some computer architectures conflate volatile memory and non-volatile memory. For example, data in volatile memory can be cached to non-volatile memory. Or a solid-state disk that employs integrated circuits to provide non-volatile memory. Some computers place data traditionally stored on disk in memory. As well, some media that are traditionally regarded as volatile can have a non-volatile form, e.g., Non-Volatile Dual In-line Memory Module variation of Dual In Line Memory Modules.

Various sets of computer- or processor-readable instructions (also called program modules), application programs and/or data can be stored in system memory 118. For example, system memory 118 may store an operating system 125, and a set of computer- or processor-readable server instructions (i.e., server modules) 127. In some implementations, server module 127 includes instructions for communicating with remote clients and scheduling use of resources including resources on the digital computer 102 and computing subsystem 104. For example, a Web server application and/or Web client or browser application for permitting digital computer 102 to exchange data with sources via the Internet, corporate Intranets, or other networks, as well as with other server applications executing on server computers.

In some implementations, system memory 118 may store a set of computer- or processor-readable calculation instructions (i.e., calculation module 129) to perform pre-processing, co-processing, and post-processing to computing subsystem 104. In accordance with the present systems and methods, system memory 118 may store at set of analog computer, or quantum computer, interface modules 131 operable to interact with the computing subsystem 104.

In some implementations, system memory 118 may store Boltzmann machine instructions or a Boltzmann machine module 133 to provide procedures and parameters for the operation of computing subsystem 104 as a Boltzmann machine. For example, the Boltzmann machine module 133 can implement the methods like those described in reference to FIGS. 8 and 9 on digital computer 102 and computing subsystem 104. The hybrid computer 100 following instructions in the Boltzmann machine module 133 can implement graphical representations of portions of Boltzmann machines such as those found in FIGS. 5, 6, and 7A and 7B.

In some implementations, system memory includes a training and validations instructions module 135. A Boltzmann machine can be trained via supervised or unsupervised learning. The hybrid computer 100 may implement training methods defined in the training and validations instructions module 135. As well, a Boltzmann machine once trained may need validating. The hybrid computer 100 may validate a Boltzmann machine following methods defined in the training and validations instructions module 135.

In some implementations, system memory 118 may store post-processing instructions or make use of the instructions in calculation instructions module 129. Execution of the post-processing instructions will cause a processor to perform post-processing a classical computing process.

In some implementations, system memory 118 may store a runtime instructions module 137 to provide executable procedures and parameters to deploy and/or monitor a Boltzmann machine.

While shown in FIG. 1 as being stored in system memory 118, the modules shown and other data can also be stored elsewhere including in non-volatile memory 122 or one or more other non-transitory computer- or processor-readable media.

Computing subsystem 104 can be provided in an isolated environment (not shown). For example, where computing subsystem 104 is a quantum computer, the environment may shield the internal elements of the quantum computer from heat, magnetic field, and the like. Computing subsystem 104 may comprise an analog processor 139. Examples of analog processor 139 include quantum processors such as those described below in reference to FIG. 2. Computing subsystem 104 may comprise a processor for gate-model quantum computing.

A quantum processor includes programmable elements such as qubits, couplers, and other devices. The qubits are read out via readout system 141. These results are fed to the various sets of computer- or processor-readable instructions for the digital computer 102 including server module 127, calculation module 129, analog computer, or quantum computer, interface modules 131, or other modules stored in non-volatile memory 122, returned over a network or the like. The qubits are controlled via qubit control system 143. The couplers are controlled via coupler control system 145. In some embodiments of the qubit control system 143 and the coupler control system 145 are used to implement quantum annealing as described herein on analog processor 139.

In some implementations, the digital computer 102 can operate in a networking environment using logical connections to at least one client computer system. In some implementations, the digital computer 102 is coupled via logical connections to at least one database system. These logical connections may be formed using any means of digital communication, for example, through a network, such as a local area network ("LAN") or a wide area network ("WAN") including, for example, the Internet. The networking environment may include wired or wireless enterprise-wide computer networks, intranets, extranets, and/or the Internet. Other embodiments may include other types of communication networks such as telecommunications networks, cellular networks, paging networks, and other mobile networks. The information sent or received via the logical connections may or may not be encrypted. When used in a LAN networking environment, digital computer 102 may be connected to the LAN through an adapter or network interface card ("NIC") (communicatively linked to system bus 116). When used in a WAN networking environment, digital computer 102 may include an interface and modem (not shown), or a device such as NIC, for establishing communications over the WAN. Non-networked communications may additionally, or alternatively, be employed.

In accordance with at least some embodiments of the present systems and devices, a quantum processor may be designed to perform gate-model quantum computing. Alternatively or in addition, a quantum processor may be designed to perform quantum annealing and/or adiabatic quantum computation. An evolution Hamiltonian is constructed, that is proportional to the sum of a first term proportional to a problem Hamiltonian and a second term proportional to a delocalization Hamiltonian, as follows:

$$H_E \propto A(t)H_P + B(t)H_D$$

where $H_D$ is the evolution Hamiltonian, $H_P$ is the problem Hamiltonian, $H_D$ is the delocalization Hamiltonian, and A(t) B(t) are coefficients that can control the rate of evolution, and typically lie in the range [0,1].

In some implementations, a time-varying envelope function is placed on the problem Hamiltonian. A suitable delocalization Hamiltonian is given by:

$$H_D \propto -\frac{1}{2}\sum_{i=1}^{N} \Delta_i \sigma_i^x$$

where N represents the number of qubits, $\sigma_i^x$ is the Pauli x-matrix for the $i^{th}$ qubit and $\Delta_i$ is the single qubit tunnel splitting induced in the $i^{th}$ qubit. Here, the $\sigma_i^x$ terms are examples of "off-diagonal" terms.

A common problem Hamiltonian includes a first component proportional to diagonal single-qubit terms, and a second component proportional to diagonal multi-qubit terms, and may be of the following form:

$$H_P \propto -\frac{\varepsilon}{2}\left[\sum_{i=1}^{N} h_i \sigma_i^z + \sum_{j>i}^{N} J_{ij}\sigma_i^z \sigma_j^z\right]$$

where N represents the number of qubits, $\sigma_i^x$ is the Pauli z-matrix for the $i^{th}$ qubit, $h_i$ and $J_{ij}$ are dimensionless local fields for the qubits, and couplings between qubits, respectively, and ε is a characteristic energy scale for $H_P$.

Here, the $\sigma_i^z$ and $\sigma_i^z\sigma_j^z$ terms are examples of "diagonal" terms. The former is a single-qubit term and the latter a two-qubit term.

Throughout this specification, the terms "problem Hamiltonian" and "final Hamiltonian" are used interchangeably unless the context dictates otherwise. Certain states of the quantum processor are energetically preferred, or simply preferred by the problem Hamiltonian. These may include ground states but may also include excited states.

Hamiltonians such as $H_D$ and $H_P$ in the above two equations, respectively, may be physically realized in a variety of different ways. A particular example is realized by an implementation of superconducting qubits as described with reference to FIG. 2 below.

The Hamiltonian can be a quantum Hamiltonian. The quantum Hamiltonian can be a quantum Hamiltonian with non-commutative terms.

One subclass of quantum local Ham iltonians involves local spin Ham iltonians whose matrix elements, in a standard basis, satisfy the condition that the off-diagonal matrix elements are real and non-positive. It can be shown that the ground-state of a Hamiltonian of this subclass has non-negative real coefficients, and that one can associate a probability distribution with the ground-state. These Hamiltonians are referred to as stoquastic Hamiltonians. For example, the quantum transverse Ising model is stoquastic. See, for example, S. Bravyi et al., "The Complexity of Stoquastic Local Hamiltonian Problems", 2008, https://arxiv.org/pdf/quant-ph/0606140v4.

Some Hamiltonians are non-stoquastic. The antisymmetry of the (first-quantized) wavefunction causes it to have sign changes in the position basis. In the occupation-number (second-quantized) basis, terms of both signs typically occur as off-diagonal matrix elements on account of the anticommutation relations of the creation and annihilation operators.

In the systems and methods described in the present application, the quantum Boltzmann machine can be operable to return equilibrium samples from eigenstates of a stoquastic Hamiltonian and/or a non-stoquastic Hamiltonian. In various of the implementations described in the present application, the Hamiltonian may be a stoquastic Hamiltonian. In other implementations described in the present application, the Hamiltonian may be a non-stoquastic Hamiltonian.

Exemplary Superconducting Quantum Processor for Quantum Annealing

Figure 2:
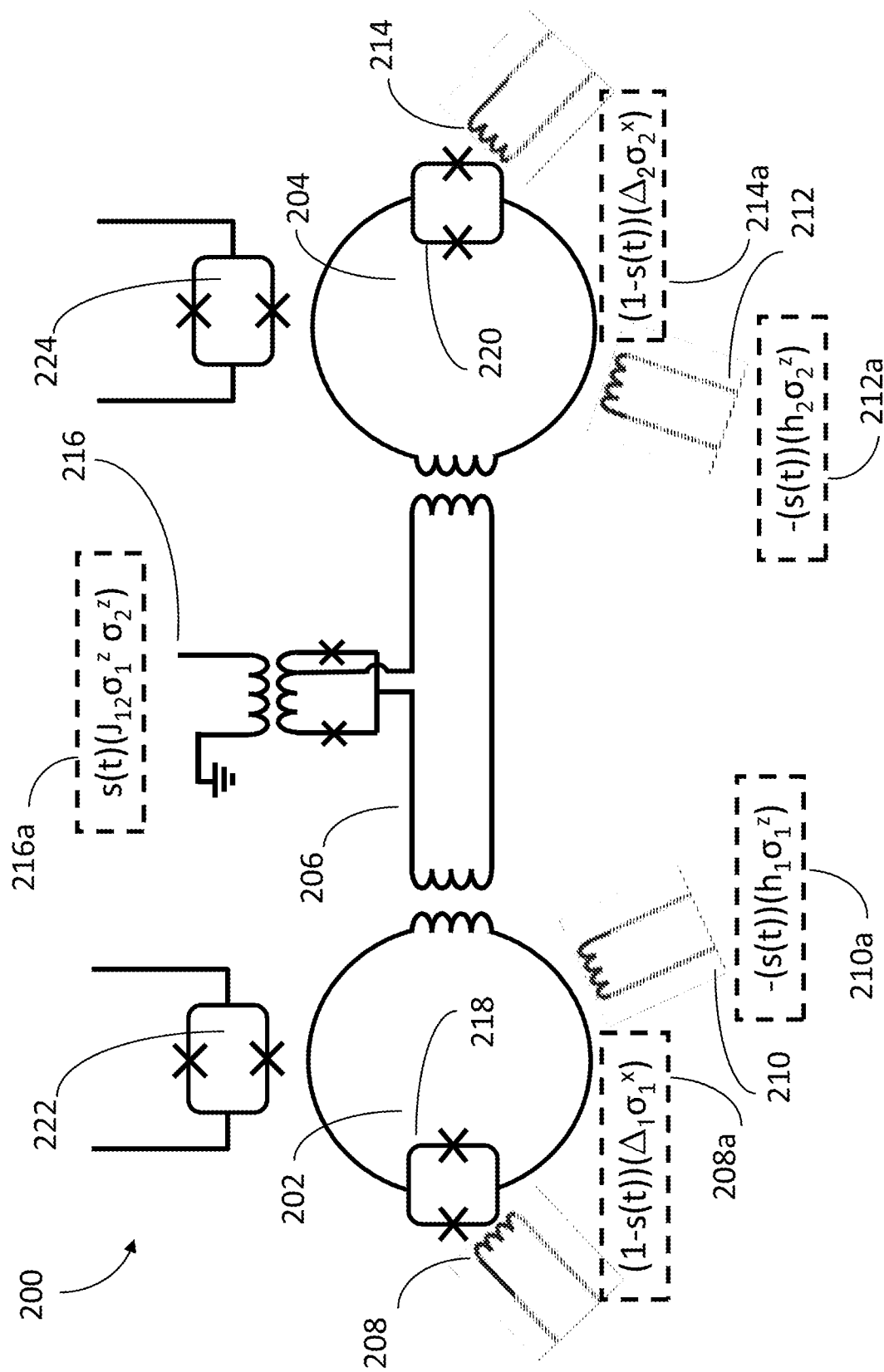
FIG. 2 is a schematic diagram that illustrates a portion of an exemplary superconducting quantum processor, suitable for implementing the quantum processor of FIG. 1, designed for quantum annealing (and/or adiabatic quantum computing) in accordance with the present systems, devices, articles, and methods.

FIG. 2 schematically illustrates a portion of an exemplary superconducting quantum processor 200, suitable for implementing quantum processor 139 of FIG. 1, designed for quantum annealing (and/or adiabatic quantum computing) in accordance with the present systems, devices, articles, and methods. The portion of superconducting quantum processor 200 shown in FIG. 2 includes two superconducting qubits 202, and 204. Also shown is a tunable $\sigma_i^z \sigma_j^z$ coupling (diagonal coupling) via coupler 206 therebetween qubits 202 and 204 (i.e., providing 2-local interaction). While the portion of quantum processor 200 shown in FIG. 2 includes only two qubits 202, 204 and one coupler 206, those of skill in the art will appreciate that quantum processor 200 may include any number of qubits and any number of couplers coupling information therebetween.

The portion of quantum processor 200 shown in FIG. 2 may be implemented to physically realize quantum annealing and/or adiabatic quantum computing. Quantum processor 200 includes a plurality of interfaces 208, 210, 212, 214, and 216 that can be used to configure and control the state of quantum processor 200. Each of interfaces 208, 210, 212, 214, and 216 may be realized by a respective inductive coupling structure, as illustrated, as part of a programming subsystem and/or an evolution subsystem. Such a programming subsystem and/or evolution subsystem may be separate from quantum processor 200, or it may be included locally (i.e., on-chip with quantum processor 200) as described in, for example, U.S. Pat. Nos. 7,876,248 and 8,035,540.

In the operation of quantum processor 200, interfaces 208 and 214 may each be used to couple a flux signal into a respective compound Josephson junction 218 and 220 of qubits 202 and 204, thereby realizing a tunable tunneling term (the $\Delta_i$ term in the system Hamiltonian). This coupling provides the off-diagonal $\sigma^x$ terms of the Hamiltonian, and these flux signals are examples of "delocalization signals".

In some implementations, the tunneling term is selected to make a first portion of the qubits on the quantum processor more classical relative a second portion of the qubits. For example, qubit 202 may be a hidden unit in a Boltzmann machine, and have a smaller tunneling term relative to qubit 204.

Similarly, interfaces 210 and 212 may each be used to apply a flux signal into a respective qubit loop of qubits 202 and 204, thereby realizing the $h_i$ terms in the system Hamiltonian. This coupling provides the diagonal $\sigma^z$ terms in the system Hamiltonian. Furthermore, interface 216 may be used to couple a flux signal into coupler 206, thereby realizing the $J_{ij}$ term(s) in the system Hamiltonian. This coupling provides the diagonal $\sigma_i^z \sigma_j^z$ terms in the system Hamiltonian.

In FIG. 2, the contribution of each of interfaces 208, 210, 212, 214, and 216 to the system Hamiltonian is indicated in boxes 208a, 210a, 212a, 214a, and 216a, respectively. As shown, in the example of FIG. 2, the boxes 208a, 210a, 212a, 214a, and 216a represent elements of time-varying Hamiltonians for quantum annealing and/or adiabatic quantum computing.

Throughout this specification and the appended claims, the term "quantum processor" is used to generally describe a collection of physical qubits (e.g., qubits 202 and 204) and couplers (e.g., coupler 206). The physical qubits 202 and 204 and the coupler 206 are referred to as the "programmable elements" of the quantum processor 200, and their corresponding parameters (e.g., the qubit $h_i$ values and the coupler $J_{ij}$ values) are referred to as the "programmable parameters" of the quantum processor. In the context of a quantum processor, the term "programming subsystem" is used to generally describe the interfaces (e.g., "programming interfaces" 210, 212, and 216) used to apply the programmable parameters (e.g., the $h_i$ and $J_{ij}$ terms) to the programmable elements of the quantum processor 200 and other associated control circuitry and/or instructions.

As previously described, the programming interfaces of the programming subsystem may communicate with other subsystems which may be separate from the quantum processor or may be included locally on the processor. As described in more detail later, the programming subsystem may be configured to receive programming instructions in a machine language of the quantum processor and execute the programming instructions to program the programmable elements in accordance with the programming instructions.

Similarly, in the context of a quantum processor, the term "evolution subsystem" generally includes the interfaces (e.g., "evolution interfaces" 208 and 214) used to evolve the programmable elements of the quantum processor 200 and other associated control circuitry and/or instructions. For example, the evolution subsystem may include annealing signal lines, and their corresponding interfaces (208, 214) to the qubits (202, 204).

Quantum processor 200 also includes readout devices 222 and 224, where readout device 222 is associated with qubit 202 and readout device 224 is associated with qubit 204. In some embodiments, such as shown in FIG. 2, each of readout devices 222 and 224 includes a DC-SQUID inductively coupled to the corresponding qubit. In the context of quantum processor 200, the term "readout subsystem" is used to generally describe the readout devices 222, 224 used to read out the final states of the qubits (e.g., qubits 202 and 204) in the quantum processor to produce a bit string. The readout subsystem may also include other elements, such as routing circuitry (e.g., latching elements, a shift register, or a multiplexer circuit) and/or may be arranged in alternative configurations (e.g., an XY-addressable array, an XYZ-addressable array, etc.). Qubit readout may also be performed using alternative circuits, such as that described in PCT Patent Publication WO2012064974.

While FIG. 2 illustrates only two physical qubits 202, 204, one coupler 206, and two readout devices 222, 224, a quantum processor (e.g., processor 200) may employ any number of qubits, couplers, and/or readout devices, including a larger number (e.g., hundreds, thousands or more) of qubits, couplers and/or readout devices. The application of the teachings herein to processors with a different (e.g., larger) number of computational components should be readily apparent to those of ordinary skill in the art.

Examples of superconducting qubits include superconducting flux qubits, superconducting charge qubits, and the like. In a superconducting flux qubit the Josephson energy dominates or is equal to the charging energy. In a charge qubit it is the reverse. Examples of flux qubits that may be used include rf-SQUIDs, which include a superconducting loop interrupted by one Josephson junction, persistent current qubits, which include a superconducting loop interrupted by three Josephson junctions, and the like. See, examples of rf-SQUID qubits in Bocko, et al., 1997, *IEEE Trans. on Appl. Supercond.* 7, 3638; Friedman, et al., 2000, *Nature* 406, 43; and Harris, et al., 2010, *Phys. Rev. B* 81, 134510; or persistent current qubits, Mooij et al., 1999, *Science* 285, 1036; and Orlando et al., 1999, *Phys. Rev. B* 60, 15398. In addition, hybrid charge-phase qubits, where the energies are equal, may also be used. Further details of superconducting qubits may be found in Makhlin, et al., 2001, Rev. Mod. Phys. 73, 357; Devoret et al., 2004, arXiv:cond-mat/0411174; Zagoskin and Blais, 2007, Physics in Canada 63, 215; Clarke and Wilhelm, 2008, Nature 453, 1031; Martinis, 2009, *Quantum Inf. Process.* 8, 81; and Devoret and Schoelkopf, 2013, *Science* 339, 1169. In some embodiments, the qubits and couplers are controlled by on chip circuitry. Examples of on-chip control circuitry can be found in U.S. Pat. Nos. 7,876,248; 7,843,209; 8,018,244; 8,098,179; 8,169,231; and 8,786,476. Further details and implementations of exemplary quantum processors that may be used in conjunction with the present systems and devices are described in, for example, U.S. Pat. Nos. 7,533,068; 8,008,942; 8,195,596; 8,190,548; and 8,421,053.

The qubits and coupling devices in a quantum processor may be arranged according to an architecture into a topology such that a certain number of qubits may be laid out in a sub-topology of qubits (hereinafter, "sub-topology"). A sub-topology is a portion of a quantum processor topology comprising qubits and coupling devices. A plurality of sub-topologies may be repeated or tiled (or otherwise directly communicatively coupled to one another) over an area of a quantum processor to produce a certain quantum processor topology.

A sub-topology is sometimes referred to as a cell or tile.

In some implementations, each sub-topology in a topology is identical to each other sub-topology in the same topology. In other implementations, one or more sub-topologies in the topology comprise a different configuration of qubits and coupling devices than another sub-topology in the same topology.

Each qubit in a sub-topology may be included in only one sub-topology such that no qubit may be included in multiple sub-topologies and no qubit may be shared among multiple sub-topologies. As used herein and in the claims, the term "cross," and variants thereof such as "crosses" or "crossing," includes "overlie," "underlie," and "overlap." Thus, "crosses" includes, for example, the situation where an outline of a portion of a first qubit on one layer or substrate is projected perpendicularly from that portion, layer, or substrate and the projection intersects an outline of a respective portion of a second qubit on another layer or substrate. A sub-topology may comprise of at least two qubits.

Exemplary Quantum Processor Topologies

Figure 3:
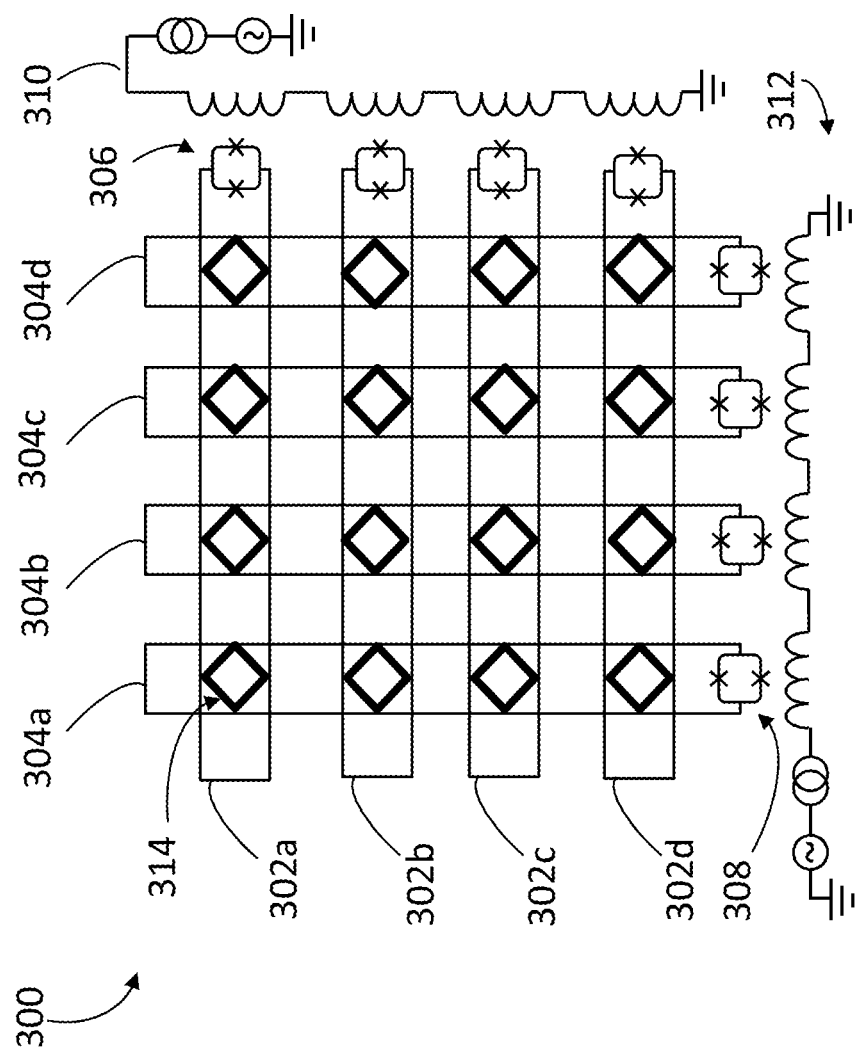
FIG. 3 is a schematic diagram of an exemplary sub-topology forming the basis of a quantum processor topology in accordance with the present systems, devices, articles, and methods.

FIG. 3 schematically shows an exemplary sub-topology 300 forming the basis of a quantum processor topology in accordance with the present systems, devices, articles, and methods Specifically, FIG. 3 illustrates a sub-topology 300 comprising eight qubits arranged as a bipartite graph—see further details in U.S. Pat. No. 8,421,053.

As shown, the qubits 302*a*, 302*b*, 302*c* and 302*d* (collectively qubits 302) of a first set of qubits each have a respective major axis along which the superconductive paths of the qubits 302 extend, the major axes laid out parallel to each other for the qubits 302 of the first set of qubits. Also as shown, the qubits 304*a*, 304*b*, 304*c* and 304*d* (collectively qubits 304) of a second set of qubits each have a respective major axis along which the superconductive paths of the qubits 304 of the second set of qubits extend, the major axes laid out parallel to each other for the qubits 304 of the second set of qubits. The major axes of the qubits 302*a*, 302*b*, 302*c* and 302*d* of the first set of qubits are perpendicular to the major axes of the qubits 304*a*, 304*b*, 304*c* and 304*d* of the second set of qubits, and a portion of a qubit in the first set of qubits crosses a respective portion of every qubit in the second set of qubits.

Each qubit 302*a*, 302*b*, 302*c* and 302*d* may be interrupted by a respective compound Josephson junction 306 (only compound Josephson junction 306 of respective qubit 302*a* is called out in FIG. 3 to reduce clutter). Each qubit 304*a*, 304*b*, 304*c* and 304*d* may be interrupted by a respective compound Josephson junction 308 (only Josephson junction 308 of respective qubit 304*a* is called out to reduce clutter).

The sub-topology 300 includes two evolution interfaces. A first evolution interface 310 is associated with the qubits in the first set of qubits 302. The first evolution interface 310 can be a global annealing line for the first set of qubits 302. A second evolution interface 312 is associated with the second set of qubits 304. The evolution interface 312 can be a global annealing line for the first set of qubits 304. The signals from first evolution interface 310 may be different than on the second evolution interface 312. For example, the annealing signal on one interface can be advanced in time with respect to the signal on the second interface.

Sub-topology 300 includes couplers to couple qubits in the first set of qubits in a sub-topology to qubits in the second set of qubits in the same sub-topology. Qubits in the first set of qubits are directly communicatively coupled (i.e., via a single coupling device) to a qubit in the second set of qubits of the same sub-topology. Coupler 314 in FIG. 3 illustrates an example of a coupling device operable to couple qubit 304*a* to qubit 302*a* (i.e., qubits in different sets of qubits in the same sub-topology that cross one another).

In the example embodiment illustrated in FIG. 3, there is no direct pair-wise coupling of qubits within the same set of qubits (the first set or the second set) within the same sub-topology. For example, there is no direct coupling between a pair of horizontal qubits or between a pair of vertical qubits in the same sub-topology. In other embodiments, there may be direct communicative coupling between a pair of qubits in the same set of qubits.

In some embodiments, a qubit in sub-topology 300 can be coupled via an inter-sub-topology coupler (not shown in FIG. 3) to a qubit in another sub-topology.

Figure 4:
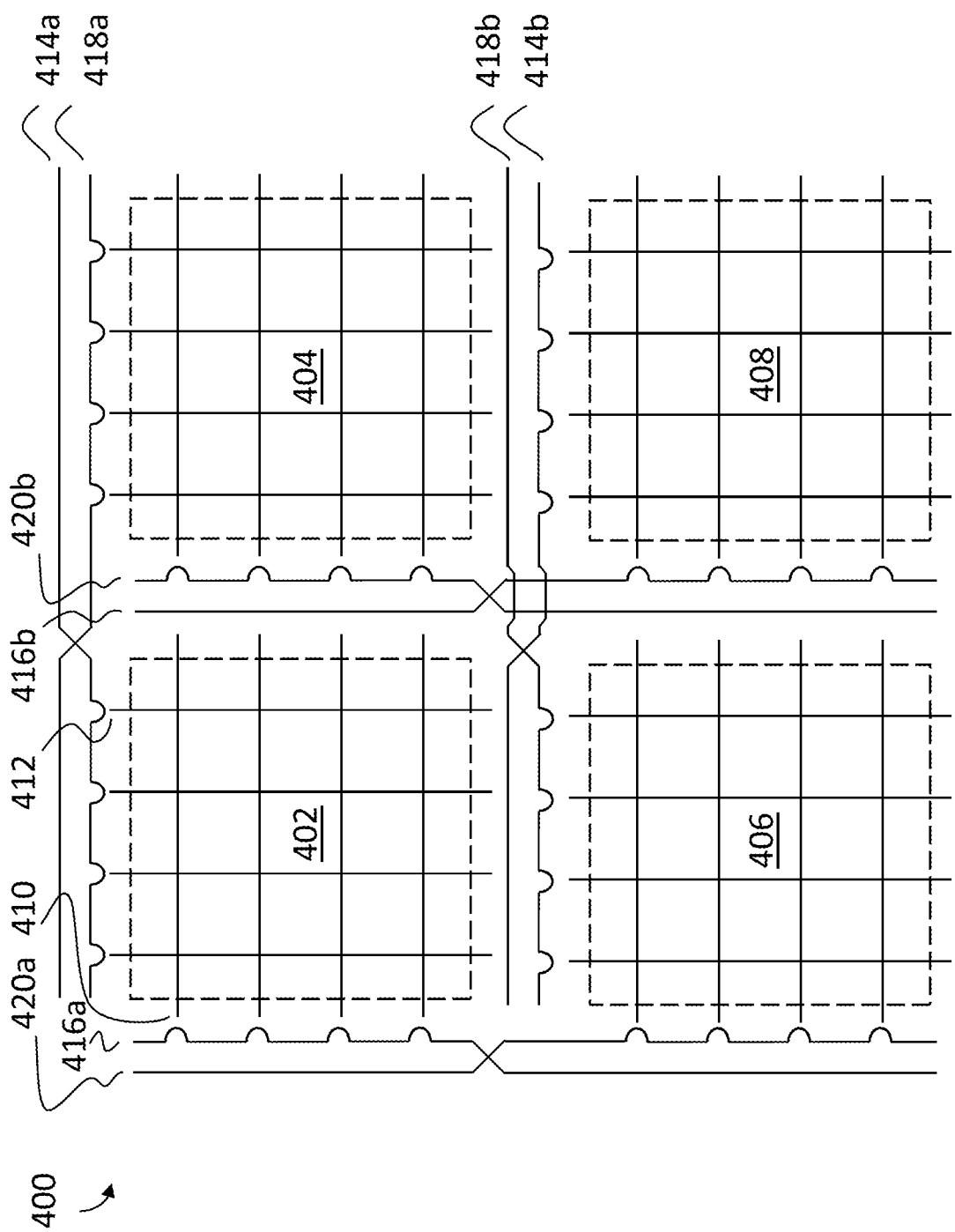
FIG. 4 is a schematic diagram of a quantum processor topology illustrating shared evolution interfaces amongst a tiling of sub-topologies, such as the sub-topology in FIG. 3, in the quantum processor topology in accordance with the present systems, devices, articles, and methods.

FIG. 4 schematically shows a quantum processor topology 400 illustrating shared evolution interfaces amongst a tiling of sub-topologies, such as sub-topology 300 in FIG. 3, in the quantum processor topology, in accordance with the present systems, devices, articles, and methods. Sub-topologies, such as sub-topology 300, may be tiled across an area of the quantum processor. Tiling sub-topologies of qubits across an area of the quantum processor forms the basis of the processor topology. FIG. 4 shows a quantum processor topology 400 based on for example sub-topology 300 of FIG. 3. Topology 400 may be a portion of a quantum processor comprised of a plurality of sub-topologies 402, 404, 406, and 408 tiled over an area such that each sub-topology is positioned adjacent at least one other sub-topology.

Topology 400 comprises sub-topologies 402, 404, 406, and 408, each illustrated in FIG. 4 as a stippled square including solid line extensions. The solid lines extending out from each stippled square represent portions of superconducting devices, such as qubits, in the sub-topology located closest to the periphery of the sub-topology. For example, portions 410 and 412 represent portions of devices in the first sub-topology 402. Portion 412 is a first device of a first set of superconducting devices in the first sub-topology 402. Portion 412 is a first device of a second set of superconducting devices in the first sub-topology 402. The first set of superconducting devices in the first sub-topology 402 is a vertical set of qubits. The second set of superconducting devices in the first sub-topology 402 is a horizontal set of qubits. Those of skill in the art will appreciate that this assignment of vertical, and horizontal directions is arbitrary, used as a convenient notation, and not intended to limit the scope of the present systems and devices in any way. In topology 400 each sub-topology has a first and a second set of qubits.

Topology 400 comprises inter-sub-topology couplers and intra-sub-topology couplers. These are not shown in FIG. 4 to reduce clutter. An example of an intra-sub-topology coupler is coupler 314 of FIG. 3. Examples of inter-sub-topology couplers are described in U.S. Pat. No. 8,421,053.

Topology 400 may include a plurality of evolution interfaces. In some implementations, the evolution interfaces are associated with different qubits on the chip in a staggered pattern. As illustrated, sub-topology 402 is positioned immediately next to evolution interface 414a and evolution interface 416a. Sub-topology 404 is positioned immediately next to evolution interface 418a and evolution interface 420b. Sub-topology 406 is positioned immediately next to evolution interface 418b and evolution interface 420a. Sub-topology 408 is positioned immediately next to evolution interface 414b and evolution interface 416b.

In some implementations, topology 400 supports a staggered pattern of four different annealing signals. If a first evolution signal is applied to evolution interfaces 414a and 414b, then the vertical qubits in sub-topologies 402 and 408 receive the same evolution signal. If a second evolution signal is applied to evolution interfaces 418a and 418b, then the vertical qubits in sub-topologies 404 and 406 receive the same evolution signal. If a third evolution signal is applied to evolution interfaces 416a and 416b, then the horizontal qubits in sub-topologies 402 and 408 receive the same evolution signal. If a fourth evolution signal is applied to evolution interfaces 420a and 420b, then the horizontal qubits in sub-topologies 406 and 404 receive the same evolution signal. A staggered set of evolution signals can be established across topology 400 beyond the four sub-topologies illustrated.

The first signal, in evolution interfaces 414a and 414b, may be different than the second signal, in evolution interfaces 418a and 418b. For example, the first signal may be advanced in time with respect to the second signal. The qubits associated with the first signal would become classical before the qubits associated with the second signal.

Training Boltzmann Machines

Figure 5:
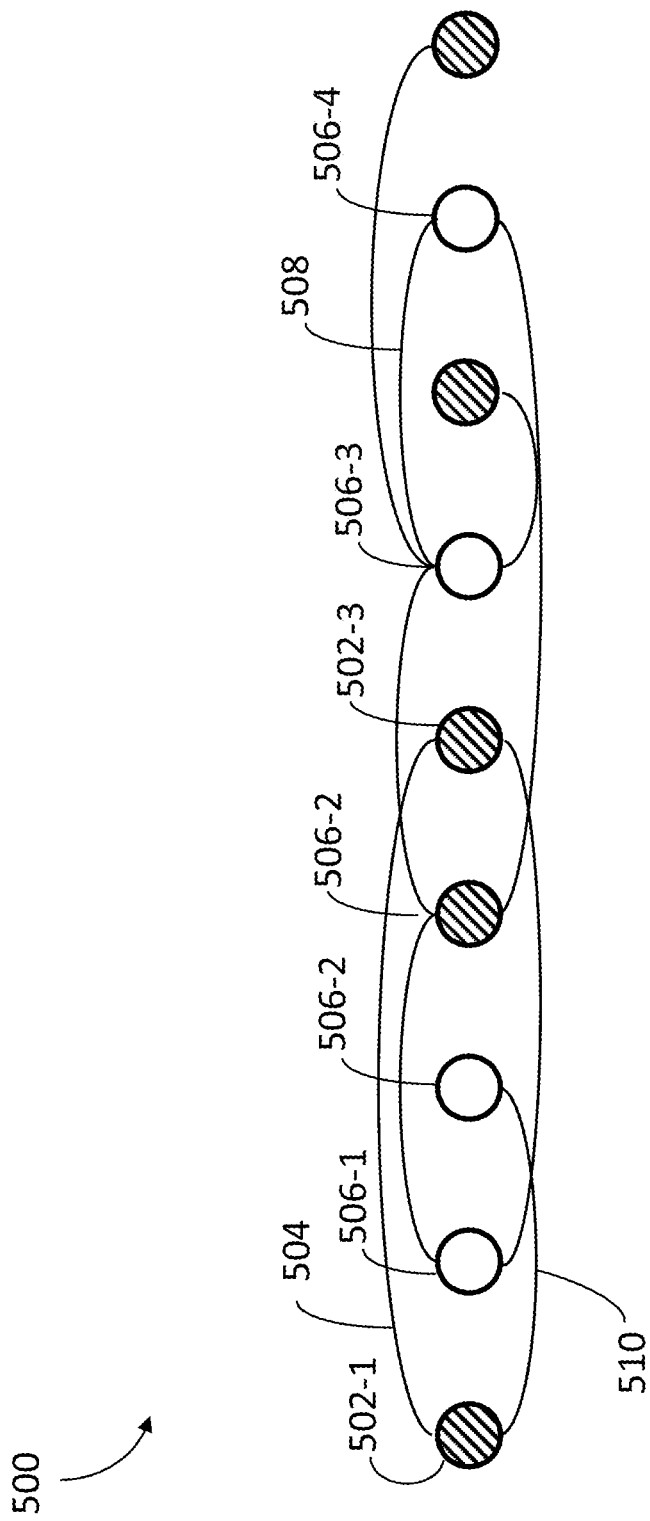
FIG. 5 is a graphical representation of an example embodiment of a portion of a Boltzmann machine, in accordance with the present systems, devices, articles, and methods.

FIG. 5 is a graphical representation of an example embodiment of a portion of Boltzmann machine 500, in accordance with the present systems, devices, articles, and methods.

A Boltzmann machine is a network comprising visible and hidden units that are symmetrically connected. Connections between units (visible, hidden, and both) can take various forms. For example, in a neural network, a connection is denominated as a synapse. In a quantum processor (as described below), units can be qubits, and connections can be formed by coupling devices providing selective, direct, pair-wise communicative coupling between qubits.

Boltzmann machine 500 includes a first plurality of units, for example visible units, indicated by circles with diagonal line patterning 502-1, 502-2, and 502-3 (only three called out, collectively 502). Visible units 502 can be communicatively connected, or communicatively coupled, to other visible units, for example, visible unit 502-1 is connected to visible unit 502-3 by connection 504.

Boltzmann machine 500 includes a second plurality of units, hidden units indicated by circles with no shading 506-1, 506-2, 506-3, and 506-4 (only four called out, collectively 506). Hidden units 506 can be communicatively connected, or communicatively coupled, to other hidden units. For example, hidden unit 506-3 is connected to hidden unit 506-4 by connection 508.

Visible units 502 can be communicatively connected, or communicatively coupled, to hidden units 506. For example, visible unit 502-1 is connected to hidden unit 506-2 by connection 510. In some implementations, connections between visible units 502, between hidden units 506, and between visible and hidden units 502 and 506, respectively, can be tunable coupling devices. In some implementations, the tunable couplings between visible units, such as connection 504, are complete.

In some implementations, Boltzmann machine 500 forms a bipartite graph, and is a restricted Boltzmann machine (RBM). The RBM has no connections between visible units 502, and no connections between hidden units 506, while having connections between at least one visible unit 502 and at least one hidden unit 506. In some examples, Boltzmann machine 500 forms a complete bipartite graph.

In some implementations, a computer, such as hybrid computer 100 of FIG. 1, can train Boltzmann machine 500. Training includes adjusting the local bias terms, and tunable couplings for, and between, the units of Boltzmann machine 500.

Boltzmann machine 500 is a stochastic system that can be trained to learn a probability distribution over its set of inputs. For a set of data, each element of the set comprising N binary variables $z_\mu = \pm 1$, the vector $v = [z_1, z_2, \ldots, z_N]$ represents a general state of the N binary variables. There is a probability $P_v^{data}$ of vector v being in the set of data.

In principle at least, a physical system can be constructed with variables $z_\mu$ such that its equilibrium distribution is $P_v^{data}$. For a general distribution, the Hamiltonian of the physical system should have $2^N$ parameters to reproduce the distribution. If the set of data has some structure, it may be possible to produce a distribution that is sufficiently close to $P_v^{data}$ using a smaller number of parameters. For example, it may be possible to use a number of parameters that has polynomial growth in N rather than exponential growth in N.

The process of adjusting the parameters of the Hamiltonian of the physical system based on the set of inputs is known as training, and the set of inputs is known as the training set.

In order to provide enough variables to perform the training, the process can introduce additional binary variables. The binary variables in the initial data set are known as the visible variables v, and the additional binary variables are known as hidden variables h.

In an Ising system containing visible and hidden variables, the total energy of the system is described by the Ising Hamiltonian:

$$H_I = -\sum_a h_a z_a - \sum_{a,b} J_{ab} z_a z_b$$

where the indices a and b cover both the visible and the hidden variables, i.e., both the visible units 502 and the hidden units 506. (The vector h describing the hidden variables should not be confused with the Hamiltonian parameter $h_a$ describing the local bias.)

In equilibrium, the probability of observing a state of the visible variables is described by a Boltzmann distribution:

$$P_v = \sum_h e^{-\beta E_{v,h}} / \sum_{v,h} e^{-\beta E_{v,h}}$$

where inverse temperature $\beta=1/(k_B T)$, $k_B$ is the Boltzmann constant, T is temperature, and $E_{v,h}$ are eigenvalues of the Hamiltonian $H_I$.

As described above, training is the process of adjusting the parameters of the Hamiltonian such that the distribution $P_v$ becomes as close to the distribution $P_v^{data}$ as possible.

In some implementations, a computer, such as hybrid computer 100 of FIG. 1 can train Boltzmann machine 500 by minimizing the log-likelihood, for example by using a gradient descent technique. The log-likelihood is described by:

$$\mathcal{L} = -\sum_v P_v^{data} \log P_v$$

The gradient descent technique takes small steps in the opposite direction to the gradient. The change in a parameter of the Hamiltonian is proportional to the negative of the gradient of the log-likelihood distribution with respect to the parameter. The constant of proportionality is known as the learning rate, and controls the step sizes.

The gradient of the log-likelihood is:

$$\frac{\partial \mathcal{L}}{\partial \theta} = \beta \left[ \sum_v P_v^{data} \left\langle \frac{\partial E_{v,h}}{\partial \theta} \right\rangle_v - \left\langle \frac{\partial E_{v,h}}{\partial \theta} \right\rangle \right]$$

The change in $h_a$ is given by:

$$\delta h_a = \beta \eta (\overline{\langle z_a \rangle_v} - \langle z_a \rangle)$$

The change in $J_{ab}$ is given by:

$$\delta J_{ab} = \beta \eta (\overline{\langle z_a z_b \rangle_v} - \langle z_a z_b \rangle)$$

where average $\overline{\langle A \rangle_v} = \Sigma_v P_v^{data} \langle A \rangle_v$, and $\eta$ is the learning rate.

The above equations express the changes to the parameters of the Hamiltonian in terms of a difference between clamped and unclamped averages, where a clamped average is one obtained for fixed v. The training process can estimate the averages using sampling.

Training Quantum Boltzmann Machines

In some embodiments, Boltzmann machine 500 is implemented on a computer comprising a quantum processor, such as quantum processor 139 of FIG. 1, and Boltzmann machine 500 is a quantum Boltzmann machine.

When implemented on a quantum processor, the units are qubits, or logical qubits comprising two or more physical qubits and one or more coupling devices, and Boltzmann machine 500 can be described by a transverse Ising Hamiltonian as follows:

$$H = -\sum_a \Delta_a \sigma_a^x - \sum_a h_a \sigma_a^z - \sum_{a,b} J_{ab} \sigma_a^z \sigma_b^z$$

where $\sigma_a^x$ and $\sigma_a^z$ are Pauli matrices, and $\Delta_a$ is the qubit tunneling amplitude.

In each measurement using the quantum system, the states of the qubits are read out in the $\sigma^z$ basis, and the outcome comprises classical binary variables for both the hidden and the visible variables. Because of the statistical nature of quantum mechanics, each measurement can generate an output v with a probability $P_v^{meas}$.

It is desirable to be able to train the parameters of the transverse Ising Hamiltonian such that the probability $P_v^{meas}$ represents the input data.

The state of Boltzmann machine 500 in the computation basis can be represented by $|v,h\rangle$. The eigenstates of H are superpositions of the states. Boltzmann machine 500 can return samples from a quantum Boltzmann distribution with a density matrix described by:

$$\rho = e^{-\beta H} / Tr[e^{-\beta H}]$$

where Tr denotes the trace of a matrix.

In embodiments where Boltzmann machine 500 is a quantum Boltzmann machine, the probability that quantum Boltzmann machine 500 returns the state v after a measurement is $P_v^{meas} = Tr[\rho \Lambda_v]$ where $\Lambda_v = \|v\rangle\langle v| \otimes \Im_h$, and $\Im_h$ is an identity matrix acting on the hidden variables.

As in the classical case, to make the measured probability distribution be as close as possible to $P_v^{data}$, the system attempts to minimize the log-likelihood, for example using a gradient descent technique. The gradient of the log-likelihood can be expressed as follows:

$$\frac{\partial \mathcal{L}}{\partial \theta} = \sum_v P_v^{data} \left( \frac{Tr\left[\frac{\partial}{\partial \theta} e^{-\beta H} \Lambda_v\right]}{Tr[e^{-\beta H} \Lambda_v]} - \frac{Tr\left[\frac{\partial}{\partial \theta} e^{-\beta H}\right]}{Tr[e^{-\beta H}]} \right)$$

Unfortunately, the first term in the above equation cannot be estimated using sampling. To get around this issue, the method invokes the Golden-Thompson inequality:

$$Tr[e^A e^B] \geq Tr[e^{A+B}]$$

which holds for any Hermitian matrices A and B, and allows $P_v^{meas}$ to be expressed as follows:

$$P_v^{meas} = \frac{Tr[e^{-\beta H} e^{\ln \Lambda_v}]}{Tr[e^{-\beta H}]} \geq \frac{Tr[e^{-\beta H + \ln \Lambda_v}]}{Tr[e^{-\beta H}]}$$

The method introduces a new Hamiltonian $H_v = H - \beta^{-1} \ln \Lambda_v$, such that:

$$P_v^{meas} \geq \frac{Tr[e^{-\beta H_v}]}{Tr[e^{-\beta H}]}$$

There is an infinite energy penalty for any state in which the visible qubits are not in state $|v\rangle$. The new Hamiltonian $H_v$ is known as a clamped Hamiltonian because the visible qubits are clamped.

Instead of minimizing the log-likelihood, the method now attempts to minimize the upper bound of the log-likelihood. The parameters of the Hamiltonian are $h_a$ and $J_{ab}$ where the indices represent both the visible and hidden variables.

The change in $h_a$ is given by:

$$\delta h_a = \beta \eta (\overline{\langle \sigma_a^z \rangle_v} - \langle \sigma_a^z \rangle)$$

The change in $J_{ab}$ is given by:

$$\delta J_{ab} = \beta \eta (\overline{\langle \sigma_a^z \sigma_b^z \rangle_v} - \langle \sigma_a^z \sigma_b^z \rangle)$$

where average $\overline{\langle A \rangle_v} = \Sigma_v P_v^{data} \langle A \rangle_v$.

As in the case of the classical Boltzmann machine, the above equations express the changes to the parameters of the Hamiltonian in terms of a difference between clamped and unclamped averages. The training process can estimate the clamped and unclamped averages using sampling from a quantum Boltzmann distribution with Hamiltonians H and $H_v$, respectively. The training system can obtain the samples from a quantum processor, for example. Alternatively, the training system can obtain the samples from a quantum Monte Carlo simulation, for example.

Supervised Learning Using a Quantum Boltzmann Machine

Figure 6:
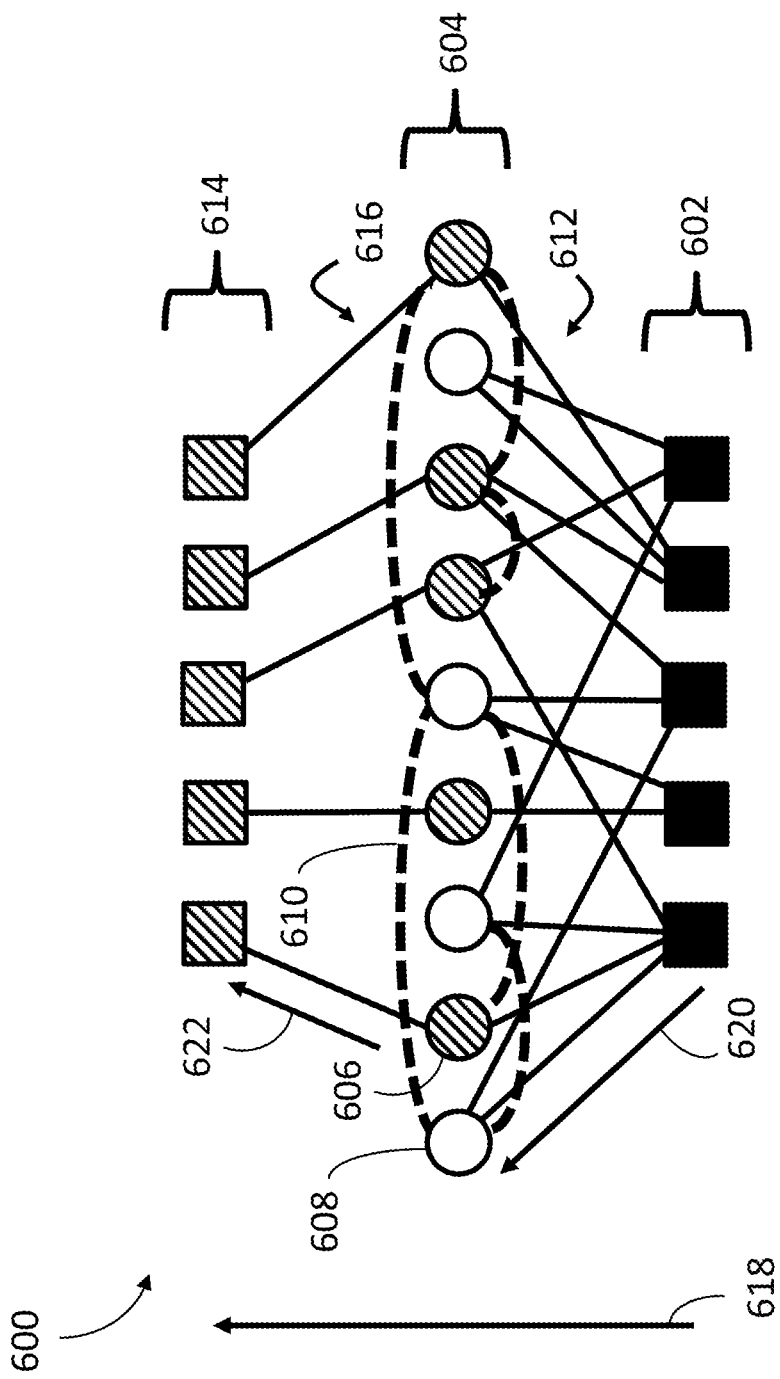
FIG. 6 is a schematic diagram of an example embodiment of a graphical portion of a quantum Boltzmann machine, in accordance with the present systems, devices, articles, and methods.

FIG. 6 is a schematic diagram of an example embodiment of a graphical portion of a quantum Boltzmann machine (QBM) 600 in accordance with the present systems, devices, articles, and methods.

QBM 600 includes an input visible layer 602. Units of input visible layer 602 are represented in FIG. 6 by squares with solid black fill. In some implementations (such as the example implementation illustrated in FIG. 6), input visible layer 602 includes no connections between the units of input visible layer 602.

QBM 600 includes a qubit layer 604. Qubit layer 604 comprises one or more visible qubits, such as visible qubit 606, represented in FIG. 6 by circles with diagonal line patterning, and one or more hidden qubits, such as hidden qubit 608, represented in FIG. 6 by circles with no shading.

The units in qubit layer 604 are quantum mechanical, and can be described by a Hamiltonian comprising an off-diagonal term that causes delocalization of state. In some implementations, qubit layer 604 includes tunable coupling devices 610 between the units of qubit layer 604.

Units in qubit layer 604 can be coupled to input visible layer 602 by tunable coupling devices 612. In some implementations, the couplings between units in qubit layer 604 and input visible layer 602 are two-local, diagonal, selective, direct, communicative couplings. In some implementations, the couplings between units in qubit layer 604 and input visible layer 602 are complete.

QBM 600 includes an output visible layer 614. Units in output visible layer 614 are represented in FIG. 6 by squares with diagonal line patterning. In some implementations, output visible layer 614, in the graphical representation of QBM 600, includes no connections between the units of output visible layer 614. For example, there may be no direct communicative coupling between the units of output visible layer 614, or there may be at least one configurable communicative coupling between the units of output visible layer 614, the configurable communicative coupling selectively configured to provide no coupling.

Visible units in qubit layer 604 can be directly, or indirectly, communicatively coupled to output visible layer 614 by tunable coupling devices 616. In some implementations, the coupling devices are two-local, diagonal couplings. In some implementations, tunable couplings 616 between visible units in qubit layer 604 and output visible layer 614 are complete, in which case the number of tunable couplings 616 is equal to the product of the number of visible units in qubit layer 604 and the number of units in output visible layer 614. In some implementations, tunable couplings 616 are less dense.

In some implementations, input visible layer 602 may not be a physical device, and instead may be a variable used to determine bias values. Similarly, output visible layer 614 may not be a physical device, and instead may be the qubit states measured by readout devices.

In some implementations, connections in QBM 600 are directional from input visible layer 602 to output visible layer 614 via qubit layer 604, as indicated by arrow 618 in the example illustrated in FIG. 6. In some implementations, bias values are provided by input visible layer 602 to qubit layer 604, as indicated by arrow 620. In some implementations, qubit values from qubit layer 604 are read out to output visible layer 614, as indicated by arrow 622.

Supervised learning divides the visible variables into input variables and output variables, such as input visible layer 602 and output visible layer 614 of FIG. 6. The supervised learning system generally knows the entire input, whereas the supervised learning system knows the output only for the training set. The supervised learning system can perform supervised learning using generative, or discriminative, methods.

Discriminative methods separate the input from the output and attempt to learn the conditional probability. It is desirable that $P_v^{meas}$ is as close as possible to the conditional probability $P_{y|x}^{data}$. As before, the method attempts to minimize a log-likelihood, the log-likelihood in this case given by:

$$\mathcal{L} = -\sum_x P_x^{data} \sum_x P_{y|x}^{data} \log P_{y|x}^{meas}$$

The method defines a clamped Hamiltonian (as described above in reference to training of a QBM), and introduces an upper bound for the log-likelihood, and attempts to minimize the upper bound, for example by a gradient descent technique. Other suitable minimization techniques can be used.

The gradient descent step for $h_a$ is given by:

$$\delta h_a = \beta \eta (\overline{\langle \sigma_a^z \rangle_{x,y}} - \overline{\langle \sigma_a^z \rangle_x})$$

The gradient descent step for $J_{ab}$ is given by:

$$\delta J_{ab} = \beta \eta (\overline{\langle \sigma_a^z \sigma_b^z \rangle_{x,y}} - \overline{\langle \sigma_a^z \sigma_b^z \rangle_x})$$

The gradient descent step for $J_{av}$ is given by:

$$\delta J_{ab} = \beta \eta (\overline{\langle \sigma_a^z x_v \rangle_{x,y}} - \overline{\langle \sigma_a^z x_v \rangle_x})$$

Deep Learning Using a QBM

Figure 7:
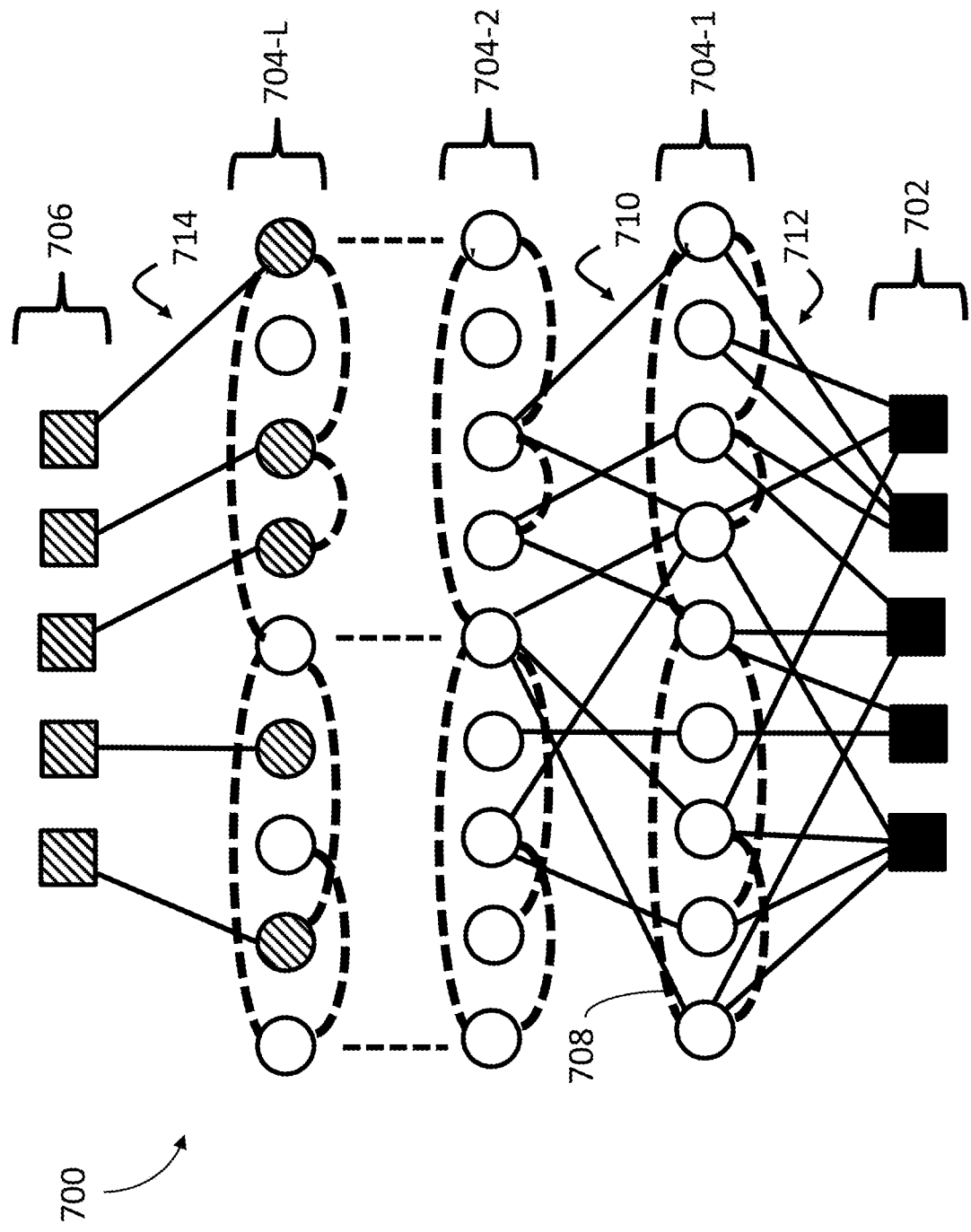
FIG. 7 is a schematic diagram of an example embodiment of a graphical portion of a quantum Boltzmann machine including more than one qubit layer, in accordance with the present systems, devices, articles, and methods.

FIG. 7 is a schematic diagram of an example embodiment of a graphical portion of a quantum Boltzmann machine (QBM) 700 including more than one qubit layer in accordance with the present systems, devices, articles, and methods. FIG. 7 illustrates an example embodiment of a directional multi-layer graph for deep learning with a QBM. The example embodiment illustrated in FIG. 7 is one approach to deep learning using a QBM. Other suitable approaches can be used.

In the illustrated embodiment, connections between layers are directional—from an input visible layer 702, via a plurality of qubit layers 704-1, 704-2, through 704-L (collectively 704), to an output visible layer 706. In some implementations, input visible layer 702 includes no connections between the units of input visible layer 702.

Plurality of qubit layers 704 can include qubit layers L layers, 704-1, 704-2, through 704-L. First qubit layer 704-1 is adjacent to input visible layer 702. $L^{th}$ qubit layer 704-L is adjacent to output visible layer 706. In some implementations, the units in qubit layers 704 are quantum mechanical devices such as qubits.

In implementations where the units in qubit layers 704 are qubits, each qubit layer (such as 704-1, 704-2, and the like) represents an independent call, or series of calls, to a quantum processor. For example, units in qubit layers 704 can be described by a Hamiltonian comprising an off-diagonal term that causes delocalization of state. In some implementations, qubit layers 704 include tunable coupling devices 708 between the units of qubit layers 704. In some implementations, connections between units within each qubit layer are not directional.

Qubit layers 704 can have connections to each other. For example, units in qubit layer 704-1 can have connections 710 to units in qubit layer 704-2, and so on.

Units in qubit layer 704-1 can be directly or indirectly communicatively coupled to units in input visible layer 702 by tunable couplings 712. In some implementations, the couplings between qubit layer 704-1 and input visible layer 702 are two-local diagonal couplings. In some implementations, the communicative couplings between qubit layer 704-1 and input visible layer 702 are complete.

QBM 700b includes an output visible layer 706. In some implementations, output visible layer 706 includes no connections between the units of output visible layer 706.

Visible units in qubit layer 704-L can be directly or indirectly communicatively coupled to output visible layer 706 by tunable coupling devices 714. In some implementations, the coupling devices are two-local, diagonal couplings. In some implementations, tunable couplings 714 between qubit layer 704-L and output visible layer 706 are complete, in which case the number of tunable couplings 714 is equal to the product of the number of visible units in qubit layer 704-L and the number of units in output visible layer 706. In some implementations, tunable couplings 714 are less dense.

In deep learning, several layers of a QBM can be connected such that each layer of the QBM can be measured independently, and information between layers transferred classically. The input x is applied to the lowermost layer in the form of biases to the qubits, and the output is read out from the uppermost layer, as before. Each intermediate layer can receive biases from a lower layer, and apply biases to an upper layer. Each layer can be measured more than once to generate samples, and the expectation values $\bar{z} = \langle \sigma_i^z \rangle$ can be estimated from the samples.

Forward and back propagation can be used to perform the deep learning. The Hamiltonian corresponding to the uppermost layer can be expressed as follows:

$$H_x^L = -\sum_{i_L} \{\Delta_{i_L}^L \sigma_{i_L}^x + [h_{i_L}^L + \tilde{h}_{i_L}^L(x)]\sigma_{i_L}^z\} - \sum_{i_L,j_L} J_{i_L j_L}^L \sigma_{i_L}^z \sigma_{j_L}^z$$

where L is the number of layers, the $L^{th}$ layer being the uppermost layer from which the output y is extracted. The bias $\tilde{h}_{i_L}^L(x)$ is a function of the lower layers from the lowermost layer to the $(L-1)^{th}$ layer:

$$\tilde{h}_{i_L} = h_{i_L} + \sum_{i_L, j_{L-1}} J_{i_L j_L} \bar{z}_{j_{L-1}}$$

The input vector x should not be confused with the index x of the Pauli matrix $\sigma_{i_L x}$ indicating the transverse field.

The probability of measuring an output state, once the input is set to x, is given by:

$$P_{y|x}^{meas} = \frac{Tr[e^{-\beta H_x^L} \Lambda_y]}{Tr[e^{-\beta H_x^L}]}$$

where $\Lambda_y^L = |y\rangle\langle y| \otimes \Im_h^L$, and denotes the state of the hidden variables in the $L^{th}$ (uppermost) layer, and where $\Im_h^L$ is an identity matrix acting on the hidden variables in the $L^{th}$ layer.

As described above, the method attempts to make $P_{y|x}^{meas}$ be as close to $P_{y|x}^{data}$ as possible by minimizing the log-likelihood. The method prepares clamped Hamiltonian as before and introduces an upper bound for the log-likelihood. The method attempts to optimize the upper bound using an optimization technique, for example using gradient descent.

To minimize the upper bound of the log-likelihood $\tilde{\mathcal{L}}$ using gradient descent, the method calculates the gradient of the upper bound $\partial \tilde{\mathcal{L}}/\partial \theta_l$ with respect to parameter $\theta_l$ corresponding to a layer l using the chain rule as follows:

$$\frac{\partial \tilde{\mathcal{L}}}{\partial \theta_l} = \sum_{i_{L-1},\ldots,i_l} \frac{\partial \tilde{\mathcal{L}}}{\partial \bar{z}_{i_{L-1}}} \frac{\partial \bar{z}_{i_{L-1}}}{\partial \bar{z}_{i_{L-2}}} \cdots \frac{\partial \bar{z}_{i_{l+1}}}{\partial \bar{z}_{i_l}} \frac{\partial \bar{z}_{i_l}}{\partial \theta_l}$$

Calculating the partial derivatives using the above equation is usually called back-propagation, and calculating for an input is called forward propagation. A result of the method is as follows:

$$\frac{\partial \bar{z}_i}{\partial h_j} \approx \beta[\langle \sigma_j^z \sigma_i^z \rangle - \langle \sigma_j^z \rangle \langle \sigma_i^z \rangle] + \frac{2\beta^3}{3} \Delta_j^2 \langle \sigma_j^z \sigma_i^z \rangle -$$

$$\frac{2\beta^3}{3} \Delta_j \left\{ h_j \langle \sigma_j^x \sigma_i^z \rangle + \sum_k (J_{kj} + J_{jk}) \langle \sigma_k^x \sigma_i^z \rangle \right\}$$

The two terms can be calculated using sampling. The third term can be neglected as long as the temperature is sufficiently high, i.e., when $T > \Delta_j, h_j, J_{jk}$.

The techniques described above for deep learning in relation to a QBM can be applied to a classical Boltzmann machine.

Deep learning can play an important role in machine learning using QBM. One benefit of deep learning is that it can mitigate limitations of the quantum hardware such as sparse connectivity, for example.

Sampling Using a Hybrid Computer

Figure 8:
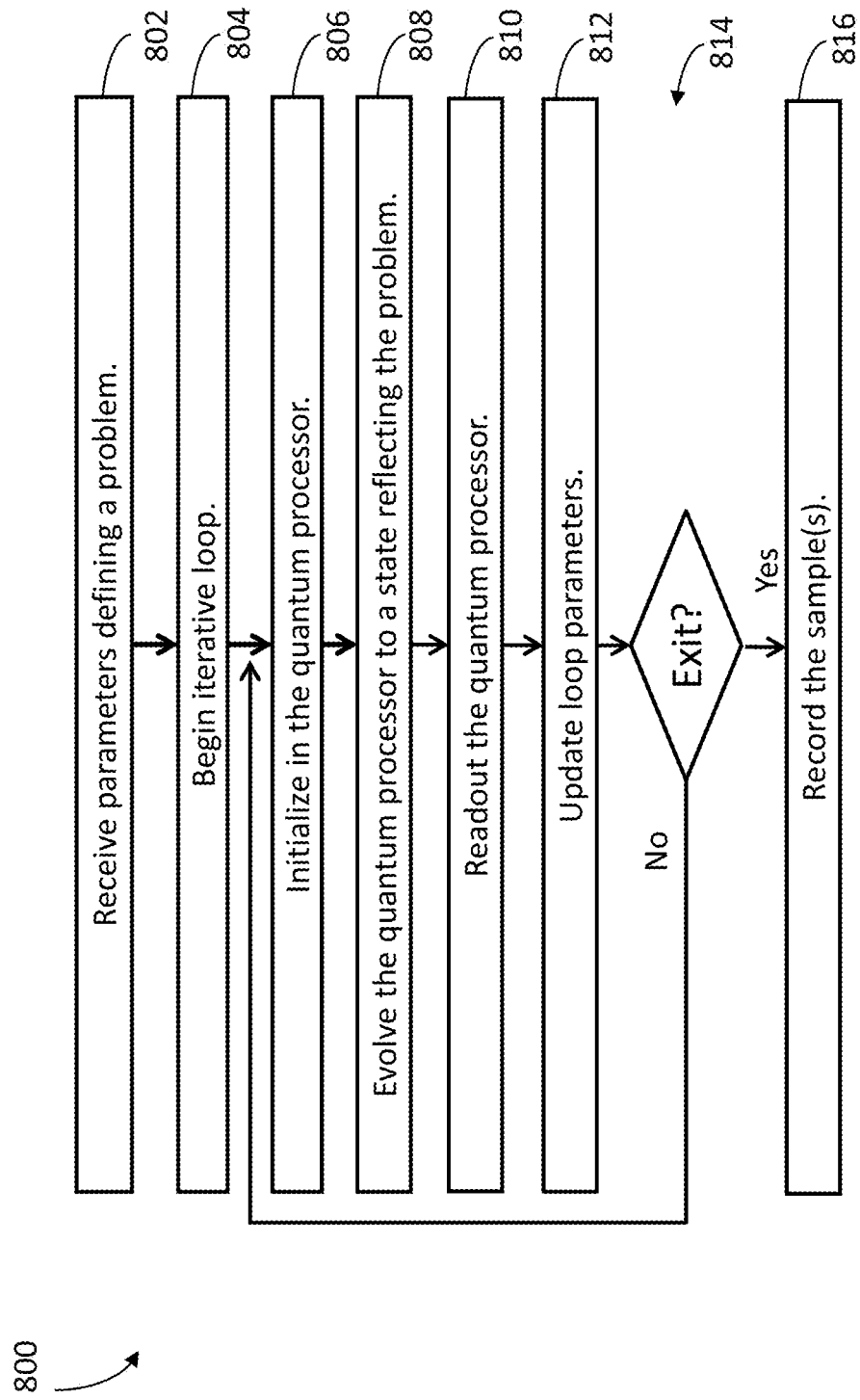
FIG. 8 is a flow-diagram showing a method of training a Boltzmann machine in accordance with the presently described systems, devices, articles, and methods.

FIG. 8 shows a method 800 of training a Boltzmann machine in accordance with the presently described systems, devices, articles, and methods. FIG. 8 includes a description the process of sampling using quantum computer. Throughout this specification and the appended claims, the terms "sample", "sampling", "sampling device", and "sample generator" are used. These terms are used herein in like manner to their corresponding uses in the arts of statistics and statistical analysis, and electrical engineering.

In statistics, a sample is a subset of a population. That is, a plurality of data points collected from a statistical population. The process of sampling is preforming this collection by a defined procedure. For example, in any population, database, or collection of objects, a sample may refer to any individual datum, data point, object, or subset of data, data points, and/or objects.

In electrical engineering and related disciplines, sampling relates to collecting a plurality of measurements of an analog signal or some other physical system. This is a conversion of a continuous signal to a discrete signal. For example, the $i^{th}$ sample of a variable X can be denoted by $X^{(i)}$.

In many fields including simulations of physical systems, computing, especially analog computing, the foregoing meanings merge. A hybrid computer can draw samples from an analog computer. The analog computer as a provider of samples is an example of a "sample generator". The analog computer can be configured to provide samples from a statistical distribution. A probability distribution assigns a respective probability of being sampled to each data point in the population.

An analog processor, such as a quantum processor (e.g. quantum processor 139 of FIG. 1), and in particular a quantum processor designed to perform quantum annealing and/or adiabatic quantum computation, may be operated as a sample generator. Here, each sample corresponds to a state of the processor and the population corresponds to all possible states of the processor. Using an analog processor as a sample generator may be a preferred mode of operating the processor for certain applications. Operating an analog processor as a sample generator may also enable a broader range of problems to be solved compared to, for example, using an analog processor to find a low energy state, or preferred state, of a Hamiltonian that encodes an optimization problem.

In some examples, a sampling device including a quantum processor, such as shown in FIG. 2, exploits the inherent randomness in a physical system, and the associated act of measurement, as a source of randomness. Such a system provides samples from even highly multi-modal distributions. In some examples, the sampling rate is quicker than possible from a digital computer. In some examples, thermal effects contribute to randomness. In some examples, quantum effects contribute to randomness. In some examples, both quantum effects and thermal effects contribute to randomness.

In ideal non-quantum physical systems, samples can be governed by a statistical distribution such as the Boltzmann distribution where the probability varies as an inverse exponential of the energy so that high energy states have low probability, and low energy states have high probability. In some examples, a sampling device at high temperature produces random samples.

In non-ideal non-quantum physical systems, samples can be governed by a different statistical distribution, and the available statistical distribution may differ from a target distribution. While sampling from a target distribution may be desirable, the sampling process can become intractable in some situations.

In some physical systems, thermal effects can compete with quantum effects. Quantum effects can also offer a source of randomness.

In ideal quantum physical systems, samples can be governed by quantum mechanics. The samples can be affected by the presence of off-diagonal terms in the Hamiltonian and the act of measuring the system. With large off-diagonal terms in the Hamiltonian, a system can, given a short evolution time, be effectively randomized. In some cases, a sampling device can produce samples from an available statistical distribution that is governed by both thermal effects and quantum effects.

FIG. 8 shows a method 800 executable by circuitry to create a sample for a set of variables from a function for the purpose of illustrating the process of sampling. One or more of these acts may be performed by or via one or more circuits, for instance one or more hardware processors. In some examples, a sampling device including a hybrid computer (such hybrid computer 100 of FIG. 1) performs the acts in method 800.

At 802, a sampling device receives a set of parameters defining the sampling process. In some examples, parameters include an objective function. In some implementations, parameters include a problem Hamiltonian that implements the objective function. In some examples, the sampling device receives parameters including the number of samples to be drawn, and additional parameters like annealing time. In some examples, one or more of the received parameters were previously received, or provided, and a selection to use one or more parameters is received. In some implementations, the sampling device uses one or more parameters by default.

At 804, the sampling device begins, or continues, an iterative loop, such as a "for" loop. The iteration is over the number of samples. At 806, the sampling device initializes a quantum processor in a ground state of the initial Hamiltonian. The initial Hamiltonian is selected because its ground state is accessible. The initial Hamiltonian is, during act 804, the instant Hamiltonian of the quantum processor. An example initialization Hamiltonian includes off-diagonal single-qubit terms.

At 808, the quantum processor, as described by its instant Hamiltonian, is evolved toward a problem Hamiltonian, $H_P$. The evolution process is described in further detail herein including example methods of FIGS. 9 and 10.

At 810, the sampling device reads out a final state for the quantum processor. In some implementations, the results of the read-out are returned. In implementations examples, the results of the read-out are stored.

At 812, the sampling device updates the counter for the for-loop. In some examples, where a "for" loop is not used, similar control variables are updated. At 814, the sampling device tests the variables used to control the loop. If the loop is to continue, the processing by the sampling device continues at 806. If the loop is to terminate, then at 816 the sampling device records the plurality of samples obtained in the loop 806-810.

In some examples, the sampling device orders the plurality of samples by energy value. Energy value is a proxy for quality of solution. In some examples, the sampling device returns the sample, or the plurality of samples, obtained in the loop 806-810.

In some embodiments of the presently-described systems and methods, computing subsystem 104 is not necessarily provided and/or is not necessarily used to obtain samples from a given distribution. For example, a given distribution (such as a quantum Boltzmann distribution) may be generated and sampled from using one or more classical heuristic methods, such as quantum Monte Carlo. Such methods may be performed by, for example, a classical digital processor 102 (which, in such embodiments, may or may not be part of a hybrid computer 100 of FIG. 1) and/or one or more other classical processors.

Example Methods for Evolving the Quantum Processor

Figure 9:
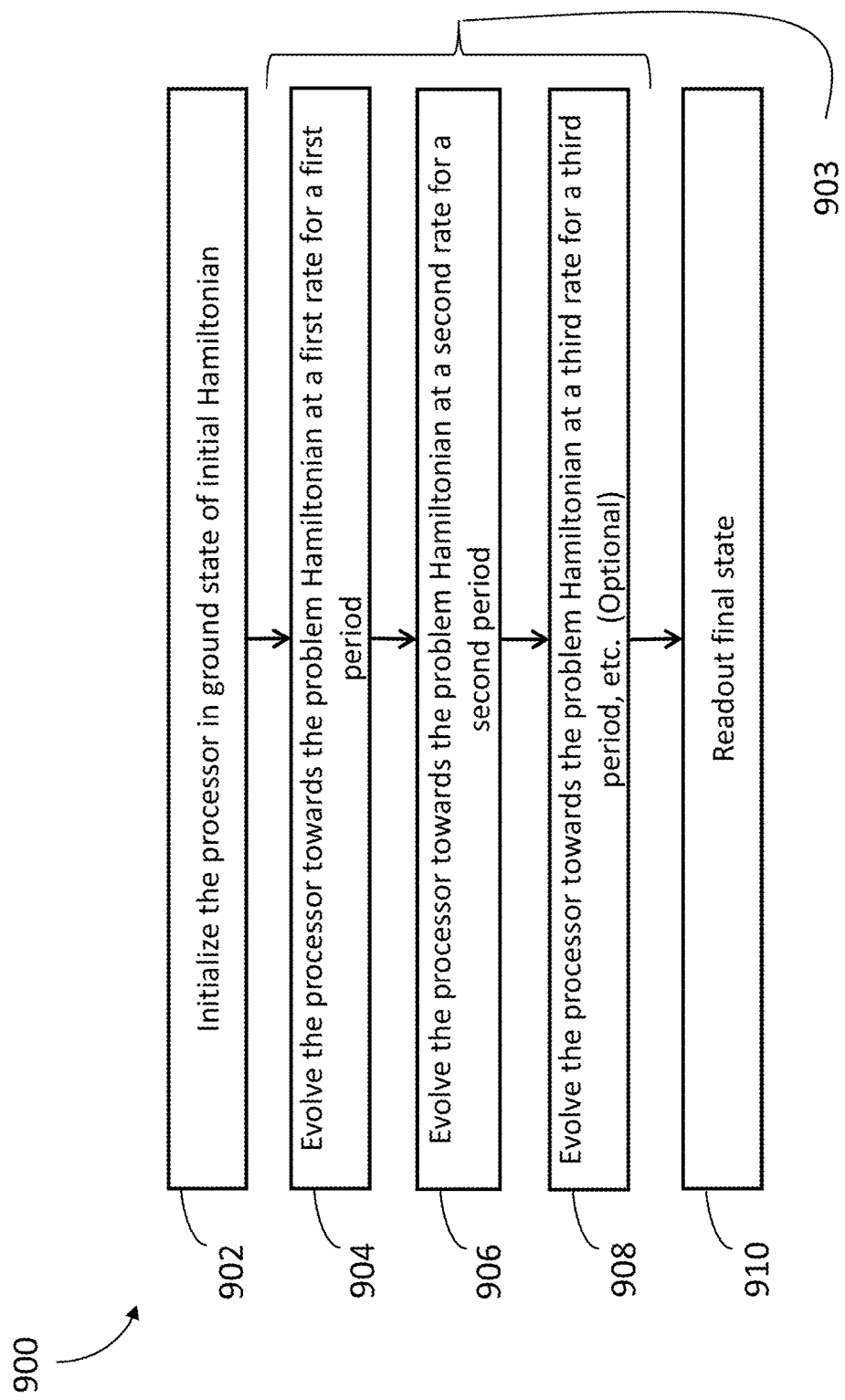
FIG. 9 is a flow diagram showing a method of operating a quantum processor with a piecewise evolution schedule in accordance with the present systems, devices, articles, and methods.

FIG. 9 is a flow diagram showing a method 900 of operating a quantum processor with a piecewise evolution schedule. The quantum processor can, for example, be quantum processor 139 of FIG. 1. Method 900 describes the acts that are, in some implementations, associated with the evolution described in FIG. 8. Method 900 could be implemented by a processor following a series of processor readable instructions stored on a non-transitory process-readable media. In some embodiments, method 900 is performed by a specialized device such as a hybrid computer (for example, hybrid computer 100 of FIG. 1). Method 900 will be described in relation to a hybrid computer comprising a quantum processor, as an example.

At 902, the hybrid computer initializes a quantum processor in a ground state of an initial Hamiltonian. The initial Hamiltonian may have an accessible ground state. At 904, the hybrid computer causes the instant Hamiltonian to evolve toward the final Hamiltonian at a first rate for a first time period. That is a first part of the evolution schedule.

The first part of the evolution schedule used by the hybrid computer can vary. In some implementations, the evolution is linear. In some implementations, the evolution is non-linear. In a linear evolution, the rate of evolution is constant. In a non-linear evolution, the rate of evolution varies, and an average rate can be used to characterize the rate over the first time period.

In some implementations, the first part of the evolution is monotonic. In some implementations, the first part of the evolution is non-monotonic.

At 906, the hybrid computer causes the instant Hamiltonian to evolve toward the final Hamiltonian at a second rate for a second time period. At 908, optionally, the hybrid computer causes the instant Hamiltonian to evolve toward the final Hamiltonian at a third rate for a third time period.

Acts 904, 906, and optional act 908 when present, comprise a piecewise evolution. A hybrid computer can cause a quantum processor to evolve under a piecewise evolution schedule. In some piecewise evolutions, the problem Hamiltonian does not change from one part of the evolution to the next.

The relative values of the first rate, the second rate, and the third rate can be varied. A useful set of rates includes having the second rate far exceed the first rate. At the beginning of annealing, thermal transitions between quantum eigenstates are very fast. The quantum processor will be in the equilibrium state. As the annealing proceeds, transitions become slower. Eventually, freeze-out can occur. In general, different transition channels can freeze at different points during the annealing. For example, a channel of transition between two states with a large Hamming distance can freeze earlier than a channel of transition between two states with a small Hamming distance. In other words, instead of an evolution characterized by a constant rate of change, such as a linear evolution, there is an evolution that changes very slowly up to some point, and then very rapidly after that.

The act of following such an evolution increases the degree of fit to the Boltzmann distribution of the samples from the quantum processor. In implementations where the second rate exceeds the first rate, the first rate can be slow enough that no transition channel will be frozen, and therefore equilibrium distribution is guaranteed. The second rate can be so fast that all transition channels freeze, and therefore the thermal distribution will not be affected. For example, the time taken during the second annealing period can be shorter than the inverse of the tunneling rate of the instant Hamiltonian just prior to the second time period. In the limit of infinitely slow sweep at the beginning and infinitely fast sweep in the second part of the annealing, an ideal Boltzmann distribution can be achieved.

At 910, the hybrid computer reads out the final state of the quantum processor. The final state of the system may be returned, or may be recorded. In some implementations, a series of final states is recorded with the associated set of first periods.

Method 900 may by summarized as a computational method including initializing of a quantum processor to a first initial state and causing the quantum processor to evolve from the initial state, under a piecewise evolution schedule, toward a first final state determined by a problem Hamiltonian associated with first computational problem. The method further includes reading out the first final state thereby determining a first result of the first computational problem. Method 900, as summarized, may be implemented by a system from processor readable instructions stored on at least one non-transitory computer- or processor-readable media.

Method 900 may be used to solve problems other than sampling problems. For example, method 900 may be used to solve a constraint satisfaction problem. The user of a hybrid computer could define a piecewise annealing schedule that includes two or more parts of the annealing schedule. In some examples, the piecewise annealing schedule includes a plurality of linear annealing schedules. In some examples, the piecewise annealing schedule includes a plurality of both linear annealing schedules and non-linear annealing schedules.

Figure 10:
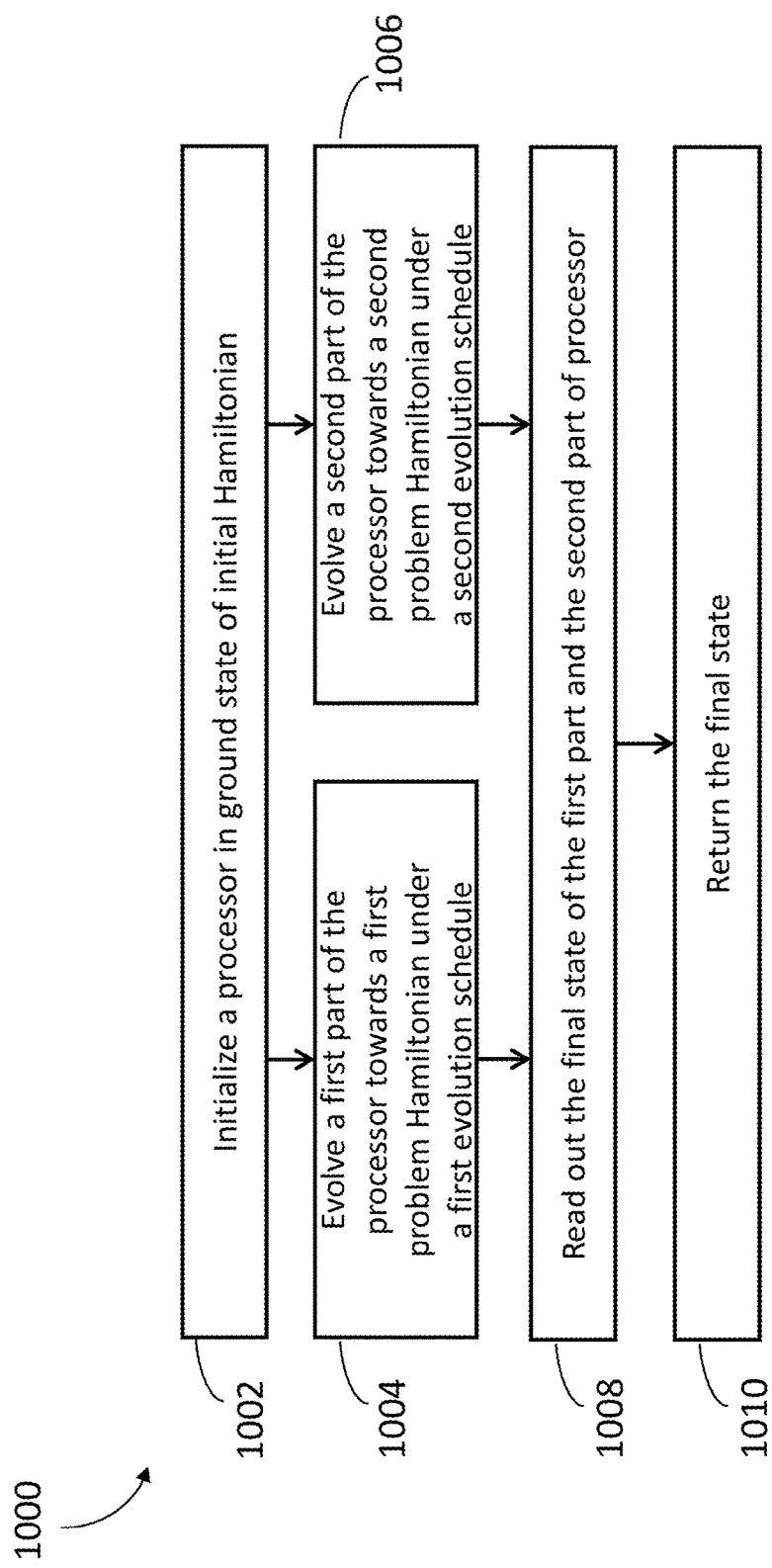
FIG. 10 is a flow diagram showing a method of operating a quantum processor with a plurality of evolution schedules, each schedule for a different portion of the quantum processor, in accordance with the present systems, devices, articles, and methods.

FIG. 10 shows a method 1000 of operating a quantum processor with a piecewise evolution schedule. The method 1000 describes the acts that are in some implementations associated with the evolution described in FIG. 8. Method 1000 could be implemented by a processor following a series of processor readable instructions stored on a non-transitory process-readable media. In some embodiments, method 1000 is performed by a specialized device such as a hybrid computer such as hybrid computer 100 of FIG. 1. Method 1000 will be described in relation to a hybrid computer as an example.

At 1002, the hybrid computer initializes a quantum processor in a ground state of an initial Hamiltonian. The initial Hamiltonian may have an accessible ground state. At 1004, the hybrid computer causes a first part of the quantum processor to evolve towards a first problem Hamiltonian under a first evolution schedule. At 1006, the hybrid computer causes a second part of the quantum processor to evolve towards a second problem Hamiltonian under a second evolution schedule.

In some implementations, the evolution of the first part of the quantum processor substantially overlaps in time with the evolution of the second part of the quantum processor.

That is, act 1004 occurs with suitable overlap with act 1006. In some implementations, the evolution of the first and second part 1004, 1006 begins at substantially the same time but the evolution for one part ends before the evolution of the other part.

In some implementations, the quantum processor has a plurality of parts each evolved under an associated evolution schedule. In some implementations the there are two evolution schedules. In some implementations, there are three or more parts of the quantum processor. In some implementations, there is a unique evolution schedule associated with each part of the quantum processor.

An example of a quantum processor that can support a plurality of different evolution schedules is shown in FIG. 4. Each annealing line can support a different evolution schedule.

At 1008, the hybrid computer reads out the final state of the quantum processor. The final state of the system may be returned (shown in act 1010) or may be recorded.

Methods for Training a QBM

Figure 11:
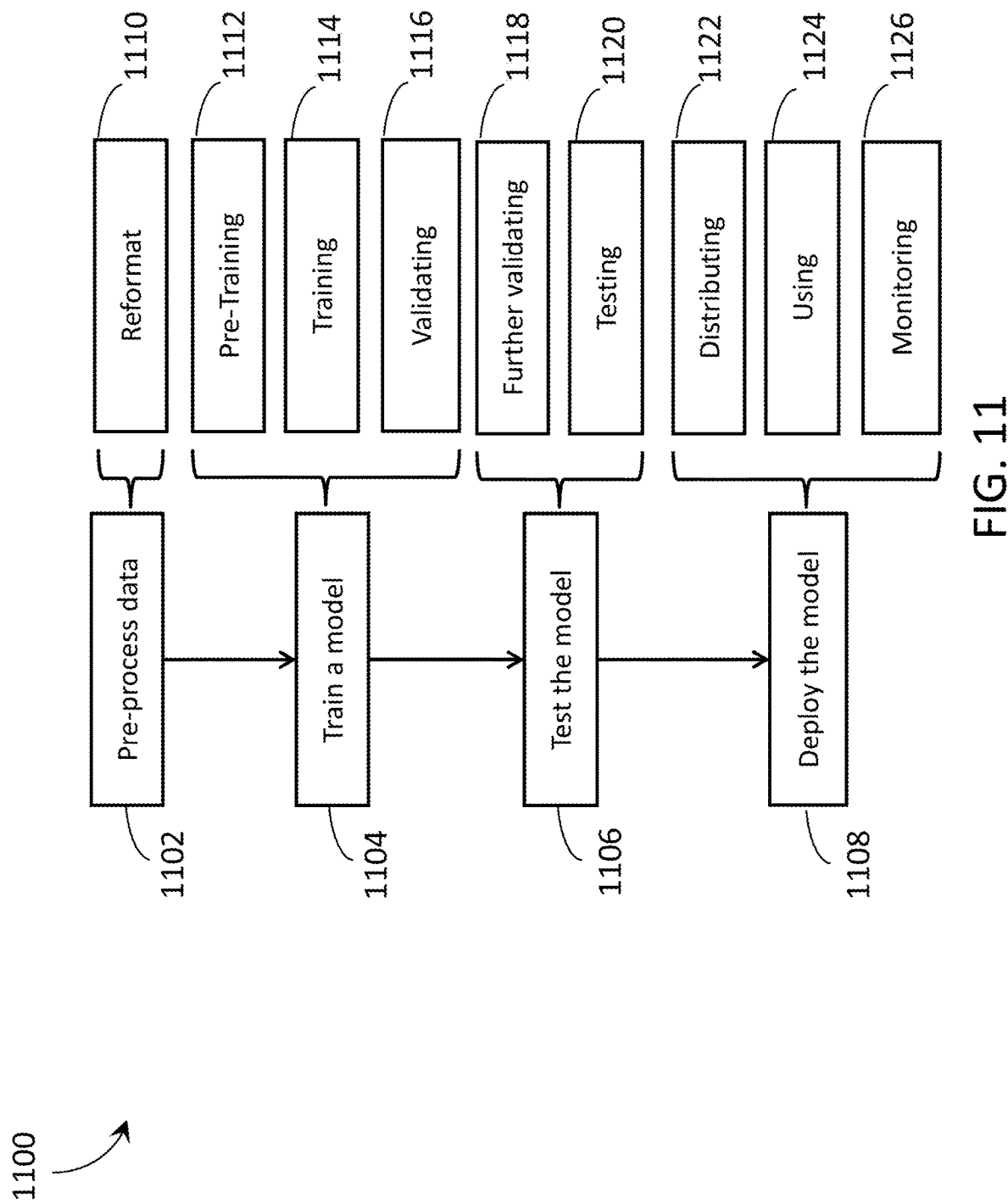
FIG. 11 is a flow diagram that illustrates a method for receiving data, analyzing the data to create a model, testing the model, and making use of the model, in accordance with the present systems, devices, articles, and methods.

FIG. 11 shows a method 1100 for receiving data, analyzing the data to create a model, testing the model, and making use of the model, in accordance with the present systems, devices, articles, and methods. One or more of these acts may be performed by or via one or more circuits, for instance one or more processors (e.g., digital processors, analog processor such as quantum processors, quantum computers such as adiabatic quantum computers and gate-model quantum computers, or a hybrid computer including both). Examples of method 1100 includes four acts 1102, 1104, 1106, and 1108, though those of skill in the art will appreciate that alternative embodiments may omit certain acts and/or include additional acts.

At 1102, a hybrid computer pre-processes data. Example acts in pre-processing include receiving, reformatting (1110), and reviewing the data. At 1110, the hybrid computer reformats the data for training a Boltzmann machine.

At 1104, the hybrid computer analyzes data to create or train a model. This set of acts known as the training phase. At 1106, the hybrid computer tests the model. At 1108 the hybrid computer deploys the model. In overview, some examples of method 1100 include a pre-processing phase (1102), a training phase (1104), testing phase (1106), and deployment phase (1108).

In some examples of the training phase 1104 there are three acts. At 1112 the hybrid computer pre-trains the data set. Example acts in pre-training include training a preliminary model from the data or a subset of the data. In some examples, the model used in pre-training differs from the model used in training. The pre-training can include a validation act. Here the computer uses the validation set to check if the pre-training is being done or was done correctly. At 1114 the hybrid computer builds or trains a model using the data set. Example acts in training are described herein. The act of training uses the data to define and update variables in a model. After the training the hybrid computer and other computers can use the model in place of the data. At 1116, the hybrid computer validates the model using an additional data set. Validation is useful to make sure the model is fitted to the data set but not over-fitted to the data set. Validation can be part of pre-training or training.

In some examples of the testing phase 1106 there are two acts. At 1118 the hybrid computer further validates the model using a further additional data set. An example of further validation includes when a potential purchaser or user of a model validates the model using a procedure like in act 1116 but using a different data set. At 1120 the hybrid computer further tests the model against functional and non-functional requirements. A functional requirement includes a test to measure the performance of the model against its intended purpose. For example, if the model is to be used as a classifier the test can include giving the model a classification task. A functional requirement includes a test to measure the performance of the model against other metric. For example, the run-time or space requirements of the model can be tested. Additional testing that the hybrid computer, or other computers, can perform in act 1114 includes user experience testing.

In some examples of the deployment phase 1108 there are three acts. At 1122, the hybrid computer, or another computer, distributes the model to one or more yet other computers. Examples of yet other computers include servers, mobile and hand held computing devices, and the like. At 1124, the hybrid computer, or the one or more other computers, use the model for the intended purpose or application of machine learning. At 1126, the model operation is monitored. Monitoring of operation of the model can include, for example, recording results, reviewing results, assessing whether the model is suitable for its intended purpose or application of machine learning, and deciding whether to re-train, re-test, and/or re-deploy the model.

In the examples described above in reference to FIG. 11, the system can be modeled as an Ising system containing visible and hidden variables, in which the total energy of the system is given by the Ising Hamiltonian described above in reference to FIG. 5 and Boltzmann machines. For a quantum processor, the Hamiltonian parameters can be local qubit biases and coupler values. In equilibrium, each configuration of visible and hidden variables can have a probability given by a Boltzmann distribution that depends on eigenvalues of a transverse Ising Hamiltonian, as described above in reference to FIG. 6. Similarly, the probability of observing a state of the visible variables can have a Boltzmann distribution.

Figure 12:
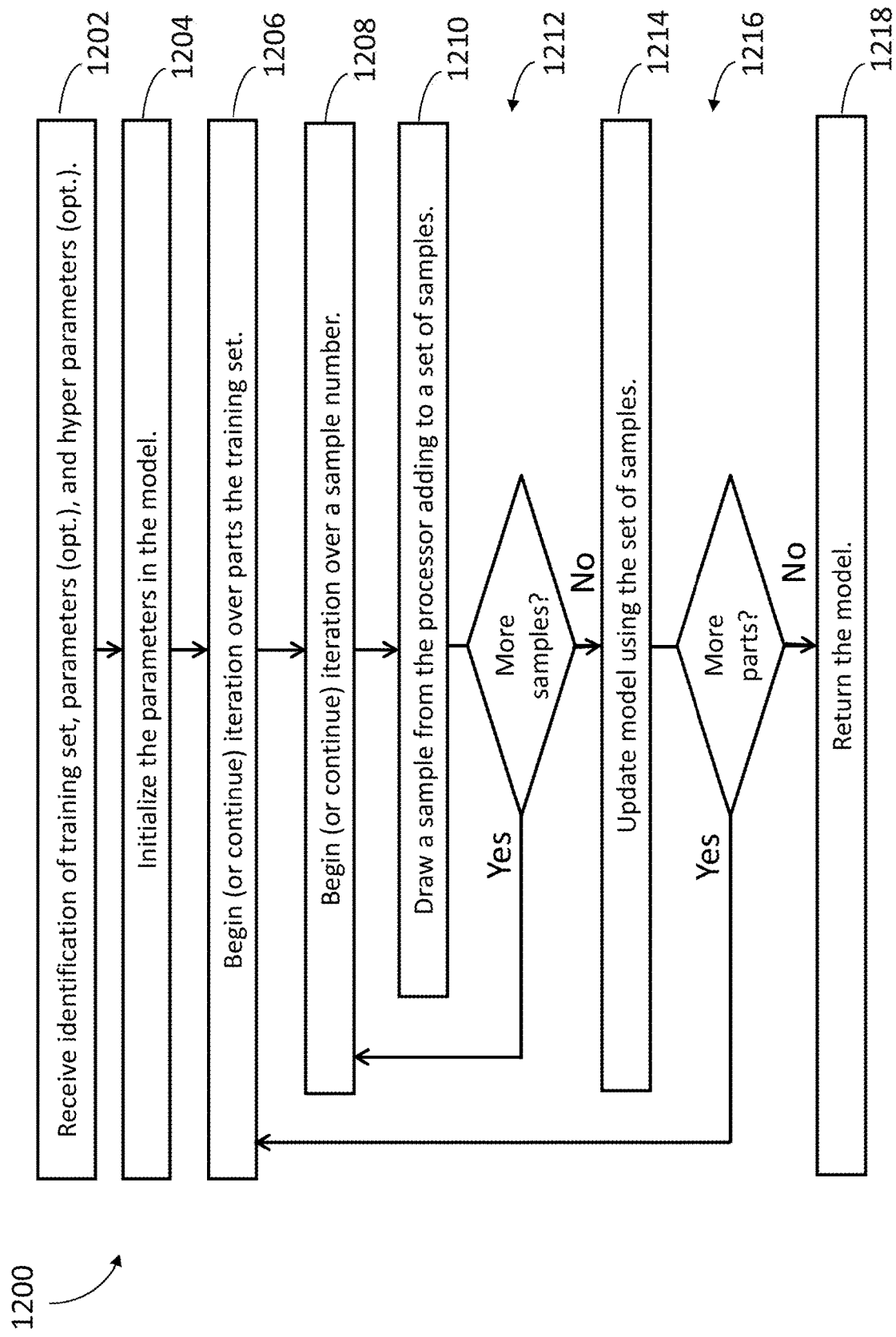
FIG. 12 is a flow diagram that illustrates a method for analyzing data in a training phase, in accordance with the present systems, devices, articles, and methods.

FIG. 12 shows a method 1200 for analyzing data in a training phase as an example of execution of act 1102 of FIG. 11. For method 1200, as with others methods taught herein, the various acts may be performed in a different order than that illustrated and described. Additionally, the methods can omit some acts, and/or employ additional acts. One or more of these acts may be performed by or via one or more circuits, for instance one or more processors (e.g., digital processors such as microprocessors, analog processor such as quantum processors, a hybrid computer including a digital processor and an analog processor, a hybrid computer including a digital processor and a quantum computer). A hybrid computer, such as, computer 100 of FIG. 1, may perform one or more of the acts in method 1200.

At 1202, a hybrid computer receives a data set. In some examples, the hybrid computer receives a model to update in view of the data set. The model can, for example, be an Ising system with an energy given by an Ising Hamiltonian or a transverse Ising Hamiltonian, as described above. The model includes parameters and values. For example, the model can include the bias and coupling parameters $\{h_a, J_{ab}\}$ and the ratio $\Delta_a/T$ of qubit tunneling amplitude to temperature. In some examples, the hybrid computer receives one or more hyper-parameters defining how the hybrid computer will train the model given the data set.

At 1204, the hybrid computer initializes the model. Examples, of an initial model include a random model, a received model, a pre-specified model, or the like. That is, setting one or more parameter values to a random value, a received value, a pre-specified value, or a mix of the forgoing. In some examples, the model includes a graphical model. In some examples, the initial value of the model includes an initial value of the graphical model comprising a set of weights and edges of a graph set to random values around zero.

At 1206, hybrid computer begins, or continues, a first iterative loop, such as a for-loop. The hybrid computer iterates over the parts of the data set. An example of a part of a data set is an image where the data set is a set of images. Another example is a portion of an image.

At 1208, hybrid computer begins, or continues, a second iterative loop, such as a for-loop. The second iterative loop is an inner loop to the first iterative loop. The hybrid computer iterates over an index for the number of a samples to be drawn from the quantum processor. The iteration continues until the desired number of samples is drawn or some other stopping condition is reached.

At 1210, a sample in a series of samples is drawn from the quantum processor in accordance with the model. The quantum processor is initialized in or near the ground state of an initial Hamiltonian. The initial Hamiltonian is selected because its ground state is accessible. The initial Hamiltonian, $H_0$, is the instant Hamiltonian of the quantum processor. An example initialization Hamiltonian includes off-diagonal single qubit terms. The quantum processor as described by its instant Hamiltonian is evolved toward a problem Hamiltonian, $H_P$. The quantum processor is read out. The results of the readout are returned. These are called samples.

At 1212 the hybrid computer tests for completion of the second iterative loop. The hybrid computer determines if a pre-specified number of samples have been drawn. If a pre-specified number of samples have been drawn (1212—Yes), processing continues at 1208. If a pre-specified number of samples have not been drawn (1212—No), the process moves along to act 1214.

At 1214 the hybrid computer uses the samples to update a model including updating the problem Hamiltonian. The model includes one or more parameters including the problem Hamiltonian. The hyper-parameters determine how the model is updated in view of the samples.

At 1216 the processing of current portion of the data set is complete. At 1216 the hybrid computer tests an exit condition of the first loop. The hybrid computer determines if there are more parts of the data set to process. If there are more parts of the data set to process (1216-Yes), processing continues at 1206 and continues with the drawing of samples for the next portion of the data set, etc. If there are not more parts of the data set to process (1216-No), processing continues at 1218.

At 1218, the hybrid computer returns the model. For example, the hybrid computer returns the model to another computer for storage, testing, or the like.

In some implementations, the overall training process can be partitioned into three parts: 1) training, 2) cross-validation, and 3) testing. The training data set can be similarly partitioned to provide data for each of the three parts of the overall training process.

In implementations where the ratio $\Delta_a/T$ of qubit tunneling amplitude to temperature is not used in the first part of the overall training process, the hybrid computer can train at more than one selected value of $\Delta_a/T$ and then perform cross-validation to determine which value of $\Delta_a/T$ yields a preferred log-likelihood.

An advantage of the systems and methods described above, in relation to machine learning using a quantum Boltzmann distribution, is that a quantum annealing machine, such as the D-Wave Two quantum computer, can yield samples from a quantum Boltzmann distribution natively. The same machine can typically only approximate samples from a classical Boltzmann distribution. With a sufficiently powerful quantum processor, a quantum annealing machine can be capable of providing high quality samples very quickly, and thereby significantly increase training efficiency.

When a quantum annealing machine is used to provide samples for training of a QBM, the machine can perform projective measurement at a selected time during an annealing schedule while qubit tunneling amplitude $\Delta_a$ is finite. One approach to implement projective measurement is to have a two-part annealing schedule with two rates, the second rate exceeding the first rate, the first rate slow enough to guarantee equilibrium distribution, and the second rate fast enough that all transition channels freeze and the thermal distribution is unaffected.

In the various implementations described in reference to FIGS. 8 to 12, the quantum processor can be an analog processor.

In some implementations, a quantum (or hybrid) computer is not necessarily provided, and the methods described above may be performed entirely classically, e.g. by one or more digital computers such as digital computer 102 of FIG. 1.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other analog processors, not necessarily the exemplary quantum processors generally described above.

The various embodiments described above can be combined to provide further embodiments. To the extent that they are not inconsistent with the specific teachings and definitions herein, all of the US patents, US patent application publications, US patent applications, referred to in this specification and/or listed in the Application Data Sheet commonly assigned to D-Wave Systems Inc., including but not limited to U.S. Patent Application Ser. No. 62/242,626, filed Oct. 16, 2015, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A hybrid computer, the hybrid computer comprising:
a digital computer comprising a training and validations instructions module operable to execute machine learning; and
a quantum computer comprising a plurality of qubits and one or more couplers that selectively provide communicative coupling between pairs of the qubits, the quantum computer which implements a quantum Boltzmann machine, the quantum Boltzmann machine operable to return one or more equilibrium samples from eigenstates of a quantum Hamiltonian, the quantum computer communicatively coupled to the digital computer to provide at least a subset of the one or more samples to the training and validations instructions module of the digital computer.

2. The hybrid computer of claim 1 wherein the quantum computer is a quantum annealer.

3. The hybrid computer of claim 2 wherein the quantum annealer is operable to follow a piecewise annealing schedule, the piecewise annealing schedule comprising projective measurement at a determined time during the piecewise annealing schedule.

4. The hybrid computer of claim 1 wherein the quantum Hamiltonian is a stoquastic Hamiltonian.

5. The hybrid computer of claim 4 wherein the stoquastic Hamiltonian is a transverse Ising Hamiltonian.

6. The hybrid computer claim 1 wherein the quantum Hamiltonian is a non-stoquastic Hamiltonian.

7. The hybrid computer of claim 1 wherein, when executed, the training and validations instructions module causes the digital computer to: receive a training set; prepare a model described by the quantum Hamiltonian; initialize one or more parameters of the model; segment the training set into one or more subsets of the training set; for each of the one or more subsets of the training set, create a sample set comprising a predetermined number of samples by repeatedly drawing a sample from the quantum Boltzmann machine implemented by the quantum computer and store the sample in the sample set until the predetermined number of samples has been drawn; and update the model using the sample set.

8. A method of training a quantum Boltzmann machine using a hybrid computer comprising a quantum computer, the method comprising:

receiving a training set by the hybrid computer;
preparing a model described by a quantum Hamiltonian;
initializing one or more parameters of the model;
segmenting the training set into one or more subsets of the training set;
for each of the one or more subsets of the training set,
creating a sample set comprising a predetermined number of samples by repeatedly drawing a sample from the quantum computer and storing the sample in the sample set until the predetermined number of samples has been drawn; and
updating the model using the sample set; and
returning the model by the hybrid computer.

9. The method of claim 8 wherein preparing a model described by a quantum Hamiltonian includes preparing a model comprising a plurality of visible variables and a plurality of hidden variables.

10. The method of claim 8 wherein preparing a model described by a quantum Hamiltonian includes preparing a graphical model comprising a plurality of vertices and one or more edges.

11. The method of claim 10 wherein initializing one or more parameters of the model includes initializing a plurality of local biases and one or more weights.

12. The method of claim 8 wherein preparing a model described by a quantum Hamiltonian includes preparing a model described by a transverse Ising Hamiltonian.

13. The method of claim 12 wherein initializing one or more parameters of the model includes initializing a ratio of a qubit tunneling amplitude to a temperature.

14. The method of claim 8 wherein creating a sample set comprising a predetermined number of samples by repeatedly drawing a sample from the quantum computer includes creating a sample set comprising a predetermined number of samples by repeatedly drawing a sample from a quantum processor.

15. The method of claim 14 wherein creating a sample set comprising a predetermined number of samples by repeatedly drawing a sample from a quantum processor includes creating a sample set that comprises a predetermined number of samples by repeatedly drawing a sample from a superconducting quantum processor comprising a plurality of superconducting qubits and one or more superconducting coupling devices.

16. A computer system that implements a Boltzmann machine, the computer system comprising:

at least one quantum processor, the at least one quantum processor comprising:
a first set of qubits that operate as a first number of visible units of the Boltzmann machine;
a second set of qubits that operate as a first number of hidden units of the Boltzmann machine;
a first plurality of tunable coupling devices, each tunable coupling device of the first plurality of tunable coupling devices providing a communicative coupling between a respective pair of qubits, one qubit of the respective pair of qubits selected from the first set of qubits and the other qubit of the respective pair of qubits selected from the second set of qubits; and
a second plurality of tunable coupling devices, each tunable coupling device of the second plurality of tunable coupling devices providing a communicative coupling between a respective pair of qubits of the second set of qubits.

17. The computer system of claim 16 wherein the Boltzmann machine is a restricted Boltzmann machine.

18. The computer system of claim 16 wherein the first set of qubits operate as an input visible layer, and the at least one quantum processor further comprising:

a third set of qubits that operate as a visible output layer, the second set of qubits that operate as the first number of hidden units of the Boltzmann machine logically coupled between the first set of qubits and the third set of qubits.

19. The computer system of claim 18, the at least one quantum processor further comprising:

a third plurality of tunable coupling devices, each tunable coupling device of the third plurality of tunable coupling devices providing a communicative coupling between a respective pair of qubits of the third set of qubits.

20. The computer system of claim 19 wherein the second set of qubits that operate as the first number of hidden units of the Boltzmann machine operate as a first hidden layer of the Boltzmann machine, and further comprising:

a fourth set of the qubits that operate as a second number of hidden units of the Boltzmann machine that operate as a second hidden layer of the Boltzmann machine; and
a fourth plurality of tunable coupling devices, each tunable coupling device of the fourth plurality of tunable coupling devices providing a communicative coupling between a respective pair of qubits, one qubit of the respective pair of qubits selected from the second set of qubits and the other qubit of the respective pair of qubits selected from the fourth set of qubits.

21. The computer system of claim 16 wherein the Boltzmann machine returns one or more equilibrium samples from eigenstates of a transverse Ising Hamiltonian.

22. The computer system of claim 21 wherein the quantum processor is a quantum annealer.

23. The computer system of claim 22 wherein the quantum annealer is operable to follow a piecewise annealing schedule, the piecewise annealing schedule comprising projective measurement at a determined time during the piecewise annealing schedule.

24. The computer system of claim 16, further comprising:
at least one digital processor; and
at least one nontransitory processor-readable media that stores at least one of digital processor executable instructions or data which, when executed by the at least one digital processor, cause the at least one digital processor to: receive a training set;
prepare a model described by a quantum Hamiltonian; initialize one or more parameters of the model; segment the training set into one or more subsets of the training set; for each of the one or more subsets of the training set, create a sample set comprising a predetermined number of samples by repeatedly drawing a sample from the Boltzmann machine implemented by the at least one quantum processor and store the sample in the sample set until the predetermined number of samples has been drawn; and update the model using the sample set.

* * * * *